(12) United States Patent
Dewan et al.

(10) Patent No.: US 11,232,144 B2
(45) Date of Patent: Jan. 25, 2022

(54) COMPUTER-IMPLEMENTED METHOD AND SYSTEM FOR COMPETENCY INFORMATION MANAGEMENT

(71) Applicant: Hitanshu Dewan, Delhi (IN)

(72) Inventors: Hitanshu Dewan, Delhi (IN); Subhasish Ghosh, Kolkata (IN)

( * ) Notice: Subject to any disclaimer, the term of this patent is extended or adjusted under 35 U.S.C. 154(b) by 488 days.

(21) Appl. No.: 16/300,943

(22) PCT Filed: May 11, 2017

(86) PCT No.: PCT/IN2017/050177
§ 371 (c)(1),
(2) Date: Nov. 12, 2018

(87) PCT Pub. No.: WO2017/195222
PCT Pub. Date: Nov. 16, 2017

(65) Prior Publication Data
US 2019/0146986 A1   May 16, 2019

(30) Foreign Application Priority Data
May 11, 2016 (IN) .............................. 201611016447

(51) Int. Cl.
| | |
|---|---|
| *G06F 16/35* | (2019.01) |
| *G06Q 10/06* | (2012.01) |
| *G06F 16/00* | (2019.01) |
| *G06F 16/335* | (2019.01) |

(52) U.S. Cl.
CPC ............ *G06F 16/358* (2019.01); *G06F 16/00* (2019.01); *G06F 16/337* (2019.01); *G06Q 10/06* (2013.01); *G06Q 10/063112* (2013.01); *G06Q 10/063118* (2013.01)

(58) Field of Classification Search
CPC ...... G06F 16/00; G06F 16/337; G06F 16/358; G06Q 10/06; G06Q 10/063112; G06Q 10/063118
See application file for complete search history.

(56) References Cited

U.S. PATENT DOCUMENTS

| | | | |
|---|---|---|---|
| 2010/0233663 A1* | 9/2010 | Pennington | G09B 19/00 434/219 |
| 2014/0278633 A1* | 9/2014 | Daly | G06Q 10/1053 705/7.14 |

* cited by examiner

*Primary Examiner* — Mark D Featherstone
*Assistant Examiner* — Samuel C Sharpless, III

(57) ABSTRACT

Embodiments herein discloses a method for competency information management. The method includes receiving an input topic. Further, the method includes causing by the competency profile manager to display a graphical element comprising at least one knowledge cluster of interconnected skills corresponding to the input topic, wherein the at least one knowledge cluster of interconnected skills are dynamically determined from a cluster-based knowledge repository based on a plurality of competency parameters. Furthermore, the method includes generating by the competency profile manager a competency profile by combining the input topic with at least one skill selected from the plurality of interconnected skills and storing the competency profile.

23 Claims, 18 Drawing Sheets

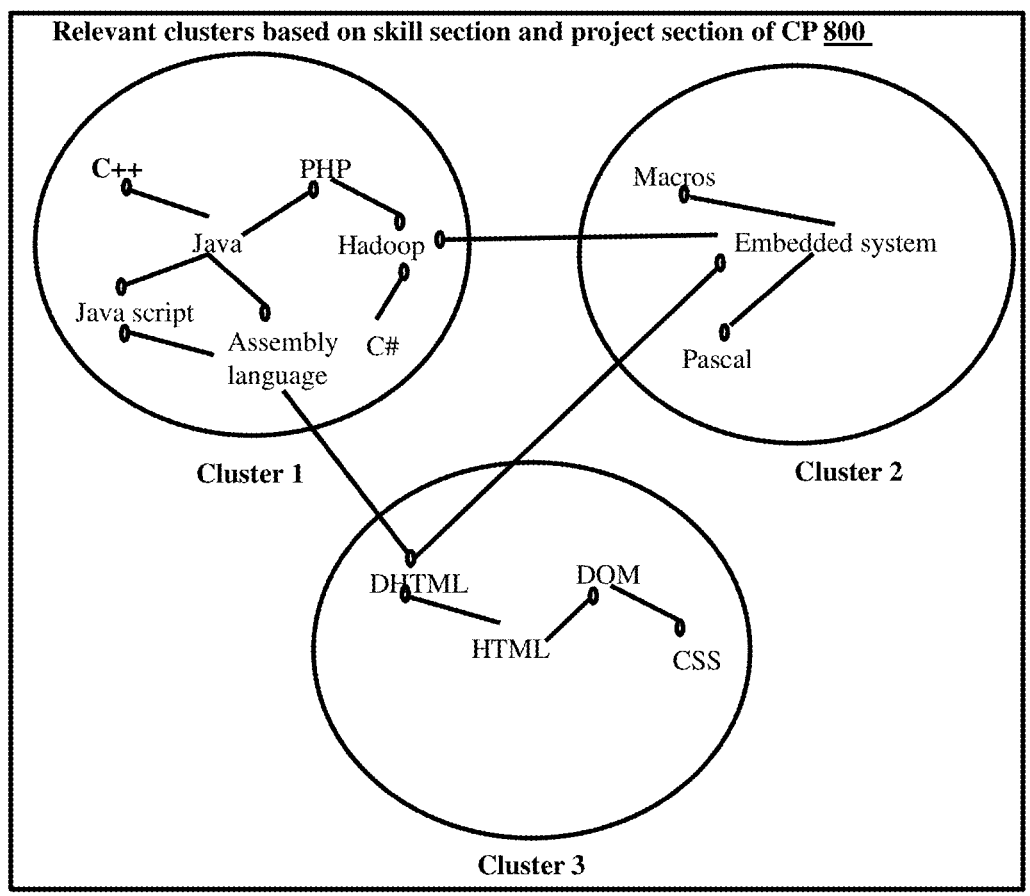
FIG. 8B (Contd..)

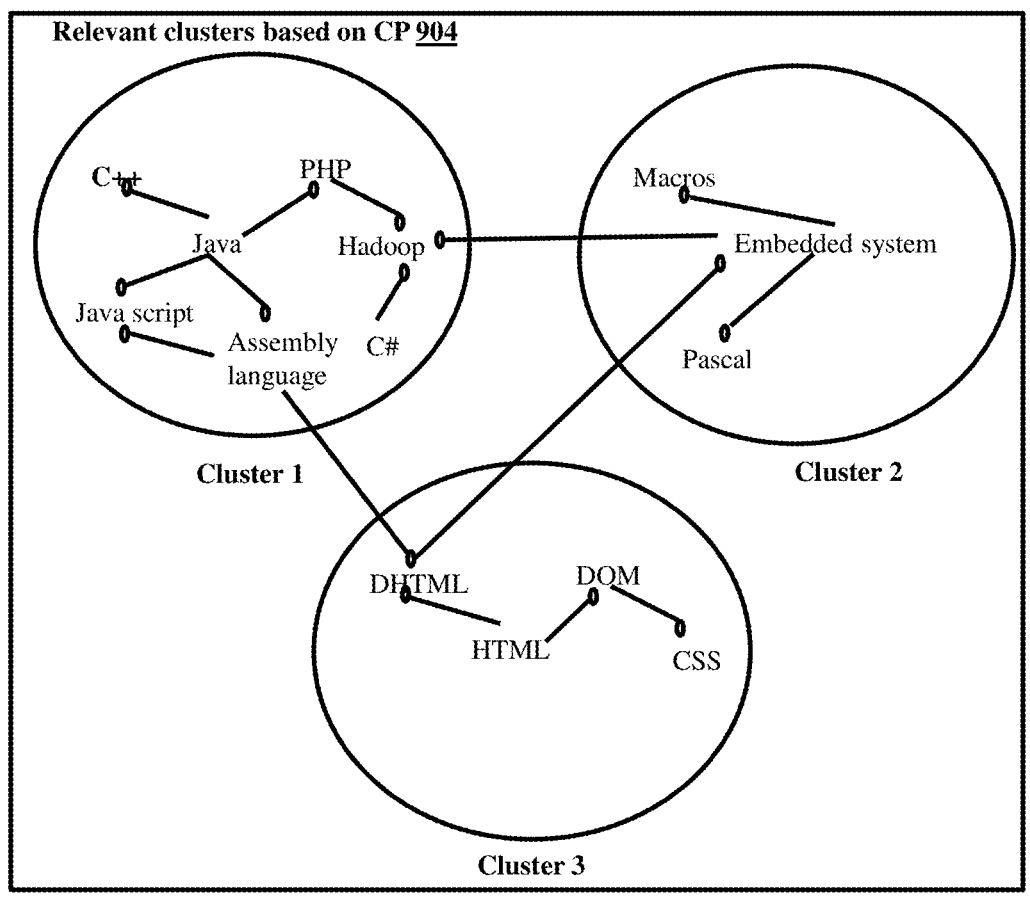
FIG. 9B (Cont..)

COMPUTER-IMPLEMENTED METHOD AND SYSTEM FOR COMPETENCY INFORMATION MANAGEMENT

The embodiments generally relate to an information management system. More particularly relates to a computer-implemented method and system for competency information management. The present application is a National Phase Application for PCT application No. PCT/IN2017/050177 filed on 11 May 2017, based on and claims priority from IN Application bearing No. 201611016447 Filed on 11 May 2016, the disclosure of which is hereby incorporated by reference herein.

FIELD OF INVENTION

Background

In general, a variety of approaches are available to find candidates having right set of knowledge or skill set corresponding to a job description. A well-known tool for candidate selection is a match between a job application and a job description. The job application helps to identify candidate qualifications, such as educational background, job history, skills or knowledge, experience, or the like.

Such tools generally adapt a keyword-based approach which may either be over inclusive or under inclusive. For example, a keyword search for "software engineer" will not return candidates who list themselves as "computer programmers," even though these two titles are understood by those in the software field to be equivalent.

Another approach is to use statistical correlation. For example, after reviewing many job applications, it may be determined that 80% of those job applications with the word "C++" also include the word "programmer." Thus, it can be assumed that a candidate specifying "C++" should be selected in a search for "programmer". However, such statistical correlations may be time consuming, expensive, and sometimes either misleading or leading to non-relevant results. For example, a person working in a pizza shop may include the word "C++" in a job application, but those with experience in pizza shop are not expected to be provided in a search for programmers. In addition, when search results are returned, it can be frustrating to be presented with narrow results or broad results of candidates that match the job description.

Further, with the advent of the electronic age and technologies, skills, knowledge or topics of various technologies are also increasing and most of them are interrelated with each other. A common challenge is to find and maintain uniformity between skills or knowledge mentioned in the job application and the job description to find right set of candidates in the conventional approaches. For example, the skill "A" may encompass different branches (subset) of skills associated (or, be interconnected) therewith. It is imperative for the job applications and the job descriptions to include appropriate set of keywords corresponding to the skills, knowledge or topics of the technology in order to maintain uniformity there between and identify the talented candidates. However, there is no provision for addressing the above mentioned disadvantages or shortcomings or at least a useful alternative.

OBJECT OF INVENTION

The principal object of the embodiments herein is to provide a computer-implemented method, system and electronic device for competency information management.

Another object of the embodiments herein is to provide a method to receive an input topic and causing to display a graphical element comprising at least one knowledge cluster of interconnected skills corresponding to the input topic. The at least one knowledge cluster of interconnected skills are dynamically determined from a cluster-based knowledge repository based on a plurality of competency parameters.

Another object of the embodiments herein is to provide a method to generate a competency profile by combining the input topic with at least one skill selected from the plurality of interconnected skills, and store the competency profile.

Another object of the embodiments herein is to provide a method to determine a plurality of qualifiers available in the competency profile.

Another object of the embodiments herein is to provide a method for validating whether skills corresponding to each of the qualifier are available in the competency profile.

Another object of the embodiments herein is to provide a method to determine a competency score based on the validation Another object of the embodiments herein is to provide a method to provide at least one recommendation based on the competency score to improvise at least one skill in the competency profile.

Yet another object of the embodiments herein is to provide a method for receiving an input profile and compute a competency score for each competency profile based on a relation between at least one qualifier available in each of the competency profile and a competency parameter dynamically defined from a cluster-based knowledge repository.

Yet another object of the embodiments herein is to provide a method for causing to display each of the competency profiles along with the corresponding competency score.

SUMMARY

Accordingly the embodiments herein provide a computer-implemented method for competency information management. The method includes receiving an input topic and causing to display a graphical element comprising at least one knowledge cluster of interconnected skills corresponding to the input topic. Further, the method includes generating a competency profile by combining the input topic with at least one skill selected from the plurality of interconnected skills and the competency profile.

In an embodiment, the method further includes determining a plurality of qualifiers available in the competency profile and validating whether skills corresponding to each of the qualifiers are available in the competency profile. Further, the method includes determining a competency score based on the validation and providing at least one recommendation based on the competency score to improvise at least one skill in the competency profile.

In an embodiment, the qualifiers includes at least one of an education level, a certification level, an experience level in a particular technical domain, availability of complete skill sets for each technical domain the competency profile, and an experience level in each of the available skills in the competency profile.

In an embodiment, the cluster-based knowledge repository includes a plurality of the knowledge clusters each comprising a set of skills interconnected among each other, wherein at least one cluster from the plurality of knowledge clusters are associated with at least one technology domain.

In an embodiment, each of the competency parameter is dynamically determined from each of the knowledge clusters of interconnected skills from the cluster-based knowledge repository based on at least one of a relation among clusters, a relation among skills available in a cluster, and a relation between skills in one cluster with the skills in another cluster.

In an embodiment, the competency parameters includes at least one of an education level, a certification level, an experience level in a particular technical domain, a relationship between one skill to another skill, a relationship between the input topic with at least one skill, and a level of experience in the at least one skill.

In an embodiment, the competency parameters are automatically determined based on the input topic and the cluster-based knowledge repository.

In an embodiment, the input topic comprises an input provided by a user, an input each section of the competency profile, a relation between each section of the competency profile, a context in each section of the competency profile is described.

Accordingly the embodiments herein provide a computer-implemented method for competency information management. The method includes receiving an input profile and computing a competency score for each competency profile based on a relation between at least one qualifier available in each of the competency profile and competency parameters dynamically defined from a cluster-based knowledge repository. Further, the method includes causing to display each of the competency profile along with the corresponding competency score, wherein the competency profiles are arranged based on the competency score.

Accordingly the embodiments herein provide an electronic device for competency information management, the electronic device comprising a cluster-based knowledge repository, a processor and a competency profile manager coupled to the processor and the cluster-based knowledge repository. The competency profile manager can be configured to receive an input topic and cause to display a graphical element comprising at least one knowledge cluster of interconnected skills corresponding to the input topic, where the at least one knowledge cluster of interconnected skills are dynamically defined from the cluster-based knowledge repository based on a plurality of competency parameters. Further, the competency profile manager can be configured to generate a competency profile by combining the input topic with at least one skill selected from the plurality of interconnected skills and store the competency profile.

Accordingly the embodiments herein provide an electronic device for competency information management, the electronic device comprising a cluster-based knowledge repository, a processor and a competency profile manager coupled to the processor and the cluster-based knowledge repository. The competency profile manager can be configured to receive an input profile, compute a competency score for each competency profile based on a plurality of interconnected qualifiers dynamically defined from the cluster-based knowledge repository, and cause to display each of the competency profiles along with the corresponding competency score, where the competency profiles are arranged based on the competency score.

Accordingly the embodiments herein provide a competency information management system including a first electronic device configured to include a cluster-based knowledge repository coupled to a knowledge manager. The knowledge manager is configured to receive an input topic, determine at least one knowledge cluster of interconnected skills corresponding to the input topic, and send the at least one knowledge cluster of interconnected skills corresponding to the input topic.

Further, the competency information management system includes a second electronic device configured to receive the at least one knowledge cluster of interconnected skills corresponding to the input topic from the first electronic device and cause to display a graphical element comprising at least one knowledge cluster of interconnected skills corresponding to the input topic. Furthermore, the second electronic device configured can be configured to receive at least one skill selected from the plurality of interconnected skills, generate a competency profile by combining the input topic with the at least one skill, and store the competency profile.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF FIGURES

This invention is illustrated in the accompanying drawings, throughout which like reference letters indicate corresponding parts in the various figures. The embodiments herein will be better understood from the following description with reference to the drawings, in which.

DETAILED DESCRIPTION OF INVENTION

Figure 1:
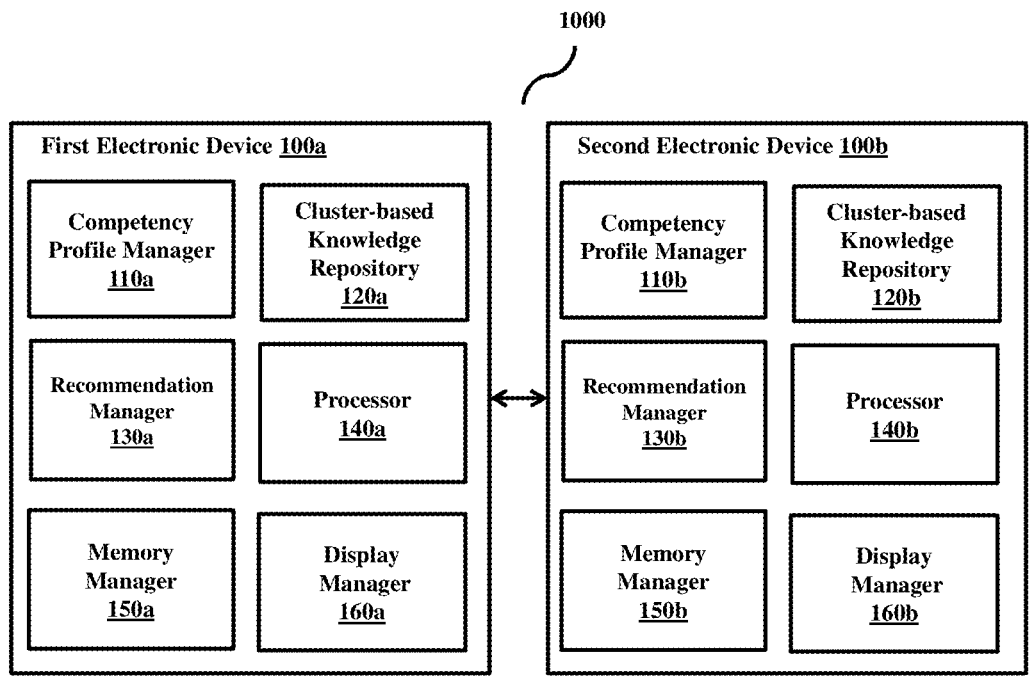
FIG. 1 illustrates a system for competency information management, according to an embodiment as disclosed herein.

Various embodiments of the present disclosure will now be described in detail with reference to the accompanying drawings. In the following description, specific details such as detailed configuration and components are merely provided to assist the overall understanding of these embodiments of the present disclosure. Therefore, it should be apparent to those skilled in the art that various changes and modifications of the embodiments described herein can be made without departing from the scope and spirit of the present disclosure. In addition, descriptions of well-known functions and constructions are omitted for clarity and conciseness.

Also, the various embodiments described herein are not necessarily mutually exclusive, as some embodiments can be combined with one or more other embodiments to form new embodiments. Herein, the term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Prior to describing the embodiments in detail, it is useful to provide definitions for key terms used herein. Unless defined otherwise, all technical terms used herein have the same meaning as commonly understood by a person having ordinary skill in the art to which this invention belongs.

The terms "first" and "second" are labels used for illustrative purpose and to differentiate one device with another and shall not be considered as restrictive without departing from the scope of the invention.

Competency score: May non-exclusively refers to a score assigned to a profile based on analyzing a wide range of characteristics (i.e., skills corresponding to each of a qualifier, expertise level, ability levels, information mentioned in different sections, a relation between one section to another section, a context in which a section is described, or the like) associated with the profile.

Knowledge cluster: May non-exclusively refers to a cluster of interconnected skills/content which are dynamically created based on specific requirements/eligibilities of an individual. In an embodiment, knowledge cluster defines a dynamic relation between each of interconnect skill/content based on an analysis of content and context of an individual requirement.

Accordingly the embodiments herein provide a computer-implemented method for competency management. The method includes receiving an input topic and causing to display a graphical element comprising at least one knowledge cluster of interconnected skills corresponding to the input topic. Further, the method includes generating a competency profile by combining the input topic with at least one skill selected from the plurality of interconnected skills and the competency profile and storing the competency profile.

Unlike the conventional systems and methods, the proposed method can be used to provide the competency profile to the user by facilitating the user with the knowledge cluster of interconnected skills corresponding to the input topic.

In the conventional systems and methods, if a user (candidates, manager, team leader, etc.,) needs to create a profile (i.e., user portfolio, resume, Job description, etc.,) then the probability of the user in providing the input parameters (i.e., all related skills corresponding to the input provided in each section of the profile can be less or may not remember to include during the time of creating the profile). The user may end-up in providing the input parameters which are known to the user at that point of time and therefore may miss to include the other relevant input parameters. Unlike the conventional systems and methods, the proposed method can be used to provide a graphical element including a knowledge cluster of interconnected skills to the user while creating the profile. Thus, the proposed method can therefore generate a competency profile based on the input parameters included in the profile provided by the user. Further, the proposed method can dynamically determine related parameters associated with a competency parameters of the competency profile, recommends the relevant parameters to the user to improve the competency profile, or the like.

In the conventional systems and methods, if a user (i.e., HR, consultants, non-technical user's in particular technical domain, or the like) is looking for the relevant job openings matching to the relevant CV or vice versa, then the user may access job search engines thereof. The user and the job search engines are solely dependent on the information presented in the CV and the JD provided. As a result, the job search engine provides the result matching to the information presented in the CV and the JD. The user being non-technical in particular domain may find the results provided by the job search engine to be relevant and only accesses the results provided thereat. Unlike the conventional methods and systems, the proposed method can be used to facilitate the user with a competency profile including all the interconnected skills corresponding to the information presented in the each section of the competency profile. Further, according to the proposed method, the job searching engine can automatically identify the interconnected skills corresponding to the information presented in the competency profile of the candidate and provides a relevant competency profiles of the job available.

Unlike the conventional systems and methods, the proposed method can be used to provide the competency profile(s) for the users, eradicating the existing CVs and JDs.

Referring now to the drawings, and more particularly to FIGS. 1 through 11 where similar reference characters denote corresponding features consistently throughout the figures, there are shown preferred embodiments.

FIG. 1 illustrates a system 1000 for competency information management, according to an embodiment as disclosed herein.

In an embodiment, a first electronic device 100a/a second electronic device 100b can be, for e.g., for example, a mobile phone, a smart phone, Personal Digital Assistants (PDAs), a tablet, a wearable device, a computer, a laptop, etc.

The first electronic device 100a includes a processor 140a (for example; a hardware unit, an apparatus, a Central Processing Unit (CPU), a Graphics Processing Unit (GPU), etc.,) communicatively coupled to a memory manager 150a (e.g., a volatile memory and/or a non-volatile memory); the memory manager 150a includes storage locations configured to be addressable through the processor 140a. Further, the first electronic device 100a includes a competency profile manager 110a, a cluster based knowledge repository 120a, a recommendation manager 130a, and a display manager 160a.

In an embodiment, the competency profile manager 110a can be configured to receive an input topic (e.g., a qualifier provided by the user, a skill provided by the user, etc.). The qualifier can be for e.g., an education level available in the competency profile, a certification level available in the competency profile, an experience level in a particular technical domain available in the competency profile, availability of complete skill sets for each technical domain in the competency profile, and an experience level in each of the available skills in the competency profile.

In another embodiment, the input topic represents or indicates the input in each section of the competency profile. For e.g., a first section in the competency profile can be the education level, a second section in the competency profile can be certification undertaken, etc. The input topic can be different in each session of the competency profile. Thus, the input topic can include the at least one of the input provided by the user and the input in each section of the competency profile, a relation between each section of the competency profile, a context (i.e., experiences, interest, objectives, etc.,) in each section of the competency profile is described.

For e.g., in the conventional methods and system, if the candidate working in a pharma industry and have an experience in pharma domain includes "C++" as one "skill" in a candidate profile, but those with experience in pharma industry are not expected to be provided in a search for programmers. Thus, causing a recruiter to sort the candidate profile of this category which is time consuming. Unlike to conventional methods and systems, the proposed method can analyze the context in which each section of the competency profile is described and therefore may provide a relevant candidate profiles based on the context analyzed.

Thus, the candidate profile experience in "pharma industry" will not be accessible to the recruiter while searching for the programmer(s).

Unlike the conventional methods and systems, the proposed method can be used to provide a recommendation of the skill/at least one knowledge cluster of the interconnected skills by analyzing each section of the competency profile. Thus, whenever the input topic in each section of the competency profile changes, the recommendation of the skill/the at least one knowledge cluster of interconnected skills also changes dynamically.

Figure 3A:
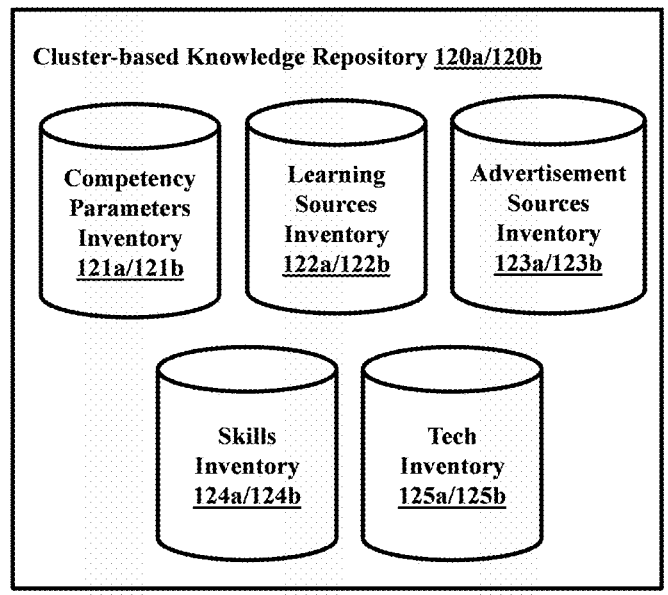
FIG. 3A illustrates various inventory blocks of a cluster based knowledge repository, according to an embodiment as disclosed herein.
Figure 3B:
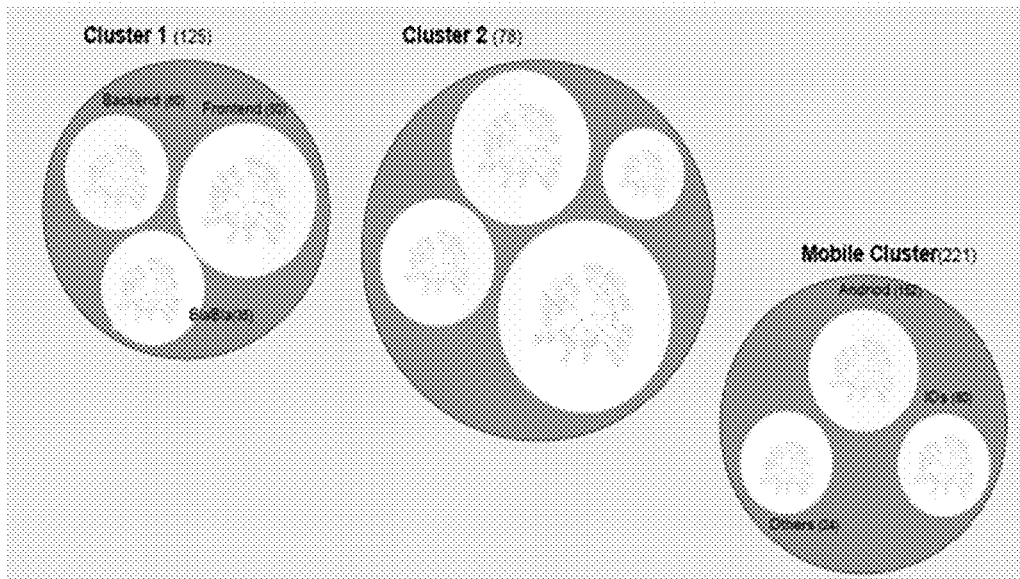
FIG. 3B illustrates a graphical element including at least one knowledge cluster, according to an embodiment as disclosed herein.

In an embodiment, the at least one knowledge cluster of interconnected skills corresponding to the input topic can be displayed through the graphical element on the display manager 160a (as shown in FIG. 3B).

The at least one knowledge cluster of interconnected skills are dynamically determined from the cluster-based knowledge repository 120a based on a plurality of competency parameters. In an embodiment, the competency parameters can be, for e.g., an education level, a certification level, an experience level in a particular technical domain, a relationship between one skill to another skill, a relationship between the input topic with at least one skill, and a level of experience in the at least one skill. In an embodiment, the competency parameters are automatically determined based on the input topic and the cluster-based knowledge repository 120a (as detailed in FIG. 3A).

Unlike the conventional methods and systems, the competency parameters are dynamically determined from each of the knowledge clusters of interconnected skills from the cluster-based knowledge repository 120a by efficiently considering the input topic in each section of the profile. As the input topic is dynamic in nature (i.e., changes time to time), the competency parameters can also be effectively determined by identifying a relation among clusters, a relation among skills available in the cluster, and a relation between the skills in one cluster with the skill in another cluster in the cluster-based knowledge repository 120a.

In an embodiment, the recommendation manager 130a communicates with the cluster-based knowledge repository 120a to recommend one or more competency parameters.

In an embodiment, the cluster-based knowledge repository 120a can be communicatively coupled to the memory manager 150a. In another embodiment, the cluster-based knowledge repository 120a can be remotely located and can be accessed by the first electronic through a network interface/wireless communication.

In an embodiment, the user can be able to select the at least one skill from the graphical element. In another embodiment, the skills can be selected automatically based on the input topic provided by the user.

Further, the competency profile manager 110a can be configured to generate (as detailed in FIG. 2) a competency profile by combining the input topic with at least one skill selected from the plurality of interconnected skills.

In an embodiment, the second electronic device 100b includes a processor 140b (for example; a hardware unit, an apparatus, a Central Processing Unit (CPU), a Graphics Processing Unit (GPU), etc.,) communicatively coupled to a memory manager 150b (e.g., a volatile memory and/or a non-volatile memory); the memory manager 150b includes storage locations configured to be addressable through the processor 140b. Further, the second electronic device 100b includes a competency profile manager 110b, a cluster based knowledge repository 120b, a recommendation manager 130b, and a display manager 160b.

In an embodiment, the competency profile manager 110b, the cluster based knowledge repository 120b, the recommendation manager 130b, and a display manager 160b described herein are same or substantially similar to the competency profile manager 110a, the cluster based knowledge repository 120a, the recommendation manager 130a, and the display manager 160a, respectively. Further, the operations performed by the competency profile manager 110b, the cluster based knowledge repository 120b, the recommendation manager 130b, and the display manager 160b are same or substantially similar to the operations performed by the competency profile manager 110a, the cluster based knowledge repository 120a, the recommendation manager 130b, and the display manager 160b respectively. According, the details of the competency profile manager 110b, the cluster based knowledge repository 120b, the recommendation manager 130b, and a display manager 160b are not described for the sake of brevity/conciseness.

In an embodiment, the memory manager 150a/150b communicatively coupled to the competency profile manager 110a/110b can be used to store the competency profiles. The memory manager 150a/150b may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory manager 150a/150b may, in some examples, be considered a non-transitory storage medium. The term "non-transitory" may indicate that the storage medium is not embodied in a carrier wave or a propagated signal. However, the term "non-transitory" should not be interpreted that the memory manager 150a/150b is non-movable. In some examples, the memory manager 150a/150b can be configured to store larger amounts of information than the memory. In certain examples, a non-transitory storage medium may store data that can, over time, change (e.g., in Random Access Memory (RAM) or cache).

In an embodiment, the display manager 160a/160b may capable of being utilized to display on the screen of the first electronic device 100a/second electronic device 100b. In an embodiment, the display manager 160a can be, for e.g., a Cathode Ray Tube (CRT), a Liquid Crystal Display (LCD), Organic Light-Emitting Diode (OLED), a Light-emitting diode (LED), Electroluminescent Displays (ELDs), field emission display (FED), etc.

In another embodiment, of the FIG. 1, the first electronic device 100a can communicate (via network interface) with the second electronic device 100b for competency information management.

For e.g., the first electronic device 100a can be a server remotely located from the second electronic device 100b. The first electronic device 100a can communicate with the second electronic device 100b through the network interface, or by another means of communication.

The competency profile manager 110a can be configured to receive the input topic. Further, the competency profile manager 110a can be configured to determine the at least one knowledge cluster of interconnected skills corresponding to the input topic, where the least one knowledge cluster of interconnected skills are dynamically defined from the cluster-based knowledge repository 120a based on the plurality of competency parameters.

Furthermore, the competency profile manager 110a can be configured to send the at least one knowledge cluster of interconnected skills corresponding to the input topic to the second electronic device 100b.

In an embodiment, the competency profile manager 110b can be configured to receive the at least one knowledge cluster of interconnected skills corresponding to the input topic from the competency profile manager 110a.

Thus, as seen above the knowledge based cluster-based knowledge repository 120a is associated with the first electronic device 100a, and the operation related to the knowledge based cluster-based knowledge repository 120a are performed by the first electronic device 100a, thereby reducing the computational time at the second electronic device 100b, and increasing the efficiency of the processor 140b and memory manager 150b.

Once, the competency profile manager 110b receives the at least one knowledge cluster of interconnected skills from the competency profile manager 110a, the competency profile manager 110b can be configured to display the graphical element on to the display screen of the display manager 160b. The graphical element includes the at least one knowledge cluster of interconnected skills corresponding to the input topic. The user of the second electronic device 100b can therefore select at least one skill from the plurality of interconnected skills present in the at least one knowledge cluster. In another embodiment, the user of the second electronic device 100b can configure a settings of the system 1000 in order for the competency profile manager 110b to automatically select the at least one skill from the at least one knowledge cluster of interconnected skills.

Further, the competency profile manager 110b can be configured to generate the competency profile. The competency profile can include the input topic provided by the user and the at least one skills from the at least one knowledge cluster of the interconnected skills. The memory manager 150b can be configured to store the competency profile.

Figure 2:
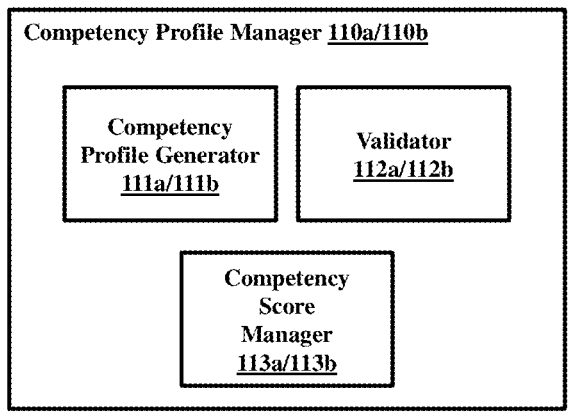
FIG. 2 illustrates various blocks of a competency profile manager for generating a competency profile, according to an embodiment as disclosed herein.

FIG. 2 illustrates various blocks of the competency profile manager 110a/110b for generating the competency profile, according to an embodiment as disclosed herein.

Referring to the FIG. 2, the competency profile manager 110a/110b includes a competency profile generator 111a/111b, a validator 112a/112b, and a competency score manager 113a/113b.

In an embodiment, the competency profile generator 111a/111b can be configured to generate the competency profile by combining the input topic with at least one skill selected from the plurality of interconnected skills.

For e.g., if the user creating the profile can provide an input as "Network Administrator" but the certification section of the profile indicates that the user concedes a certification in CCNA, unlike the conventional system, the proposed system can be used to identify the competency parameters of the input topic "CCNA certified" such as, for example, WAN troubleshooting", CCENT, "TCP/IP and OSI model or the like. Further, a unique graphical element including the knowledge cluster of interconnected skill as WAN troubleshooting", CCENT, "TCP/IP and OSI model or the like are displayed. Unlike the conventional system, the proposed system can be used to provide the input topic including information about what user has currently provided and also information from the other sections of the profile. The input topic described herein is dynamic in nature so as to automatically identify competency parameters from the cluster-based knowledge repository 120a/120b as when each section or portion of the profiled is filled or updated by the user.

Thus, with the aid of the aforementioned knowledge cluster of interconnected skill the user can therefore be able to create the competency profile.

In an embodiment, the validator 112a/112b can be configured to determine the plurality of qualifiers available in the competency profile and validate whether skills corresponding to each of the qualifier is available in the competency profile, where the skills are dynamically defined based on the plurality of competency parameters.

For e.g., if the competency profile of the user contains "Microsoft® certified technology specialists as a qualifier, then the validator 112a/112b can be configured to validate whether skill "windows configuration" is available in the competency profile.

In an embodiment, the competency score manager 113a/113b can be configured to determine a competency score based on the validation. Considering the above example, the competency score manager 113a/113b based on the input (i.e., the skill "windows configuration" is not available in the competency profile) received from the validator 112a/112b, can provide a score of "3".

In an embodiment, the recommendation manager 130a/130b coupled to the competency profile manager 110a/110b can be configured to recommend the user to include the skill "windows configuration" in the competency profile, based on the competency score to improvise at least one skill in the competency profile.

Considering the above e.g., the competency score manager 113a/113b based on the competency score recommends the user to include the skill "windows configuration" in the competency profile. Thus, by virtue of the recommendation, the competency score for the competency profile is increased to "5" from the competency score "3".

In yet another example, consider the user has provided two certifications in the profile, such as "related certifications" and "other certifications". The related certifications i.e., Microsoft® certified technology specialists obtained in the related skill such as "windows configuration" is given higher weightage, for e.g., 80%, and other certification i.e., Java/testing certified related to skill is given less weightage, for e.g., 20%.

FIG. 3A illustrates various inventory blocks of the cluster based knowledge repository 120a/120b, according to an embodiment as disclosed herein.

Referring to the FIG. 3A, the cluster based knowledge repository 120a/120b includes a competency parameter inventory 121a/121b, a learning source inventory 122a/122b, an advertisement sources inventory 123a/123b, skills inventory 124a/124b, and a technology inventory 125a/125b.

In an embodiment, the cluster-based knowledge repository 120a/120b includes a plurality of the knowledge clusters each comprising a set of skills interconnected among each other, where at least one cluster from the plurality of knowledge clusters are associated with at least one technology domain.

In an embodiment, the competency parameter inventory 121a/121b can include a plurality of competency parameters associated with each skills, a plurality of competency parameters associated with plurality of the qualifiers, etc. For e.g., the competency parameter of the "Microsoft® certified technology specialists" can include "windows configuration", windows server active directory configuration, windows network infrastructure configuration, or the like.

The learning source inventory 122a/122b includes the plurality of courses/sources at which the candidate can seek guidance, certification, books, or the like which can be used by the recommendation manager 130a/130b for recommending the user to improvise the competency score of the given competency profile. For e.g., if the competency score of the "X" competency profile is "3", then the recommendation manager 130a/130b can communicate with the learning source inventory 122a/122b to recommend the source (i.e., institute, web sites, online learning portal, etc.) at which the user can learn obtain the skills required to improvise the score from "3" to score "5".

Further, the advertisement sources inventory 123a/123b includes a plurality of advertisements related to the recommended learning skills in order to improvise the competency score. For e.g., the advertisement related to institute at which "cloud computing programs" are conducted may be advertised on to the display screen of the first electronic device 100a/second electronic device 100b.

The skills inventory 124a/124b includes a plurality of skills available in each technology domain. For e.g., skills available in GUI developer domain, animation domain, etc.

The technology inventory 125a/125b includes a plurality of technology topics which aids the user to keep updated with and to improvise the competency score.

For e.g., if the candidate in the profile has provided an input topic "C programmer", the competency profile manager 110a can be configured to analyze the input topic and provide an interconnected skill i.e., "embedded "C" program developer (an advance level of "C programmer") is currently the most aspiring filed, and most of the companies are in need of the candidate having the skill in "embedded "C" program developer". Then, the recommendation manager 130a/130b can explore the learning source inventory 122a/122b, the advertisement sources inventory 123a/123b, the skills inventory 124a/124b, and the technology inventory 125a/125b, in order to provide the one or more recommendations thereof.

Further, the learning source inventory 122a/122b, the advertisement sources inventory 123a/123b, the skills inventory 124a/124b, and technology inventory 125a/125b can be dynamically be updated based on existing techniques such as machine learning, deep learning, frequent operations performed by the user, etc.

FIG. 3B illustrates the graphical element including at least one knowledge cluster, according to an embodiment as disclosed herein.

In an embodiment, the graphical element as illustrated in the FIG. 3B is merely an example and thus can be represented by any other graphical element.

Figure 4:
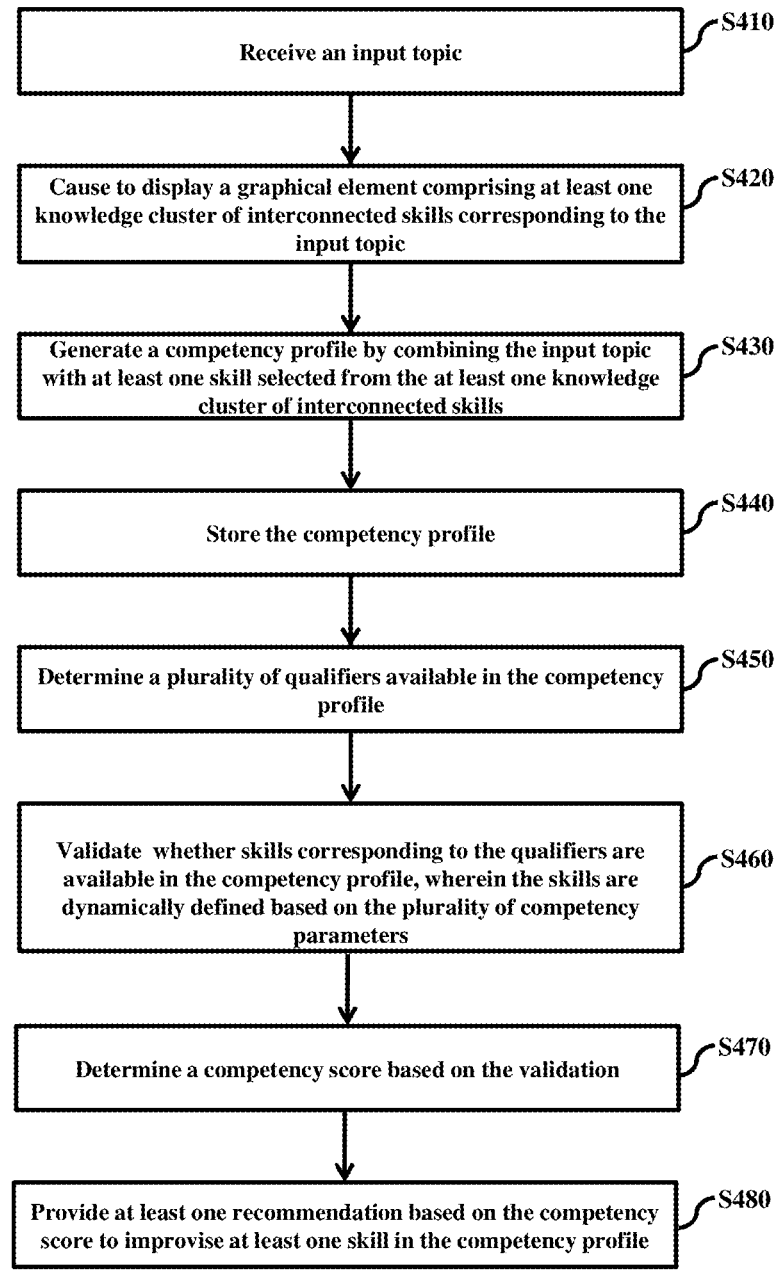
FIG. 4 is a flow chart illustrating a method for the competency information management, according to an embodiment as disclosed herein.

FIG. 4 is a flow chart illustrating a computer-implemented method for competency information management, according to an embodiment as disclosed herein.

Referring to the FIG. 4, at S410, the electronic device 100 receives the input topic. For example, in the first electronic device 100a/second electronic device 100b as illustrated in the FIG. 1, the competency profile manager 110a/110b can be configured to receive the input topic. The input topic is based on at least one of an input provided by the user and the input each section of the competency profile. For example, consider that the input provided by the user is 'Java' and the input from each section of the competency profile includes a "PHP" project completed by the user.

At S420, the first electronic device 100a/second electronic device 100b causes to display the graphical element comprising at least one knowledge cluster of interconnected skills corresponding to the input topic. For example, in the first electronic device 100a/second electronic device 100b as illustrated in the FIG. 1, the competency profile manager 110a/110b can be configured to cause to display the graphical element comprising at least one knowledge cluster of interconnected skills corresponding to the input topic ("Java"). Thus, based on the above example, the at least one knowledge cluster of interconnected skills of the PHP developer i.e., DHTML is provided. Thus, the JD including the DHTML can also be relevant to the candidate.

At S430, the first electronic device 100a/second electronic device 100b generates the competency profile by combining the input topic with at least one skill selected from the at least one knowledge cluster of interconnected skills. For example, in the first electronic device 100a/second electronic device 100b as illustrated in the FIG. 1, the competency profile manager 110a/110b can be configured to generate the competency profile by combining the input topic with at least one skill selected from the at least one knowledge cluster of interconnected skills.

At S440, the first electronic device 100a/second electronic device 100b stores the competency profile. For example, in the first electronic device 100a/second electronic device 100b as illustrated in the FIG. 1, the memory manager 150a/150b can be configured to store the competency profile.

At S450, the first electronic device 100a/second electronic device 100b determines the plurality of qualifiers available in the competency profile. For example, in the first electronic device 100a/second electronic device 100b as illustrated in the FIG. 1, the competency profile manager 110a/110b can be configured to determine the plurality of qualifiers available in the competency profile.

At S460, the first electronic device 100a/second electronic device 100b validates whether skills corresponding to the qualifiers are available in the competency profile, wherein the skills are dynamically defined based on the plurality of competency parameters. For example, in the first electronic device 100a/second electronic device 100b as illustrated in the FIG. 1, the competency profile manager 110a/110b can be configured to validate whether skills corresponding to the qualifiers are available in the competency profile, wherein the skills are dynamically defined based on the plurality of competency parameters.

At S470, the first electronic device 100a/second electronic device 100b determines the competency score based on the validation. For example, in the first electronic device 100a/second electronic device 100b as illustrated in the FIG. 1, the competency profile manager 110a/110b can be configured to determine a competency score based on the validation.

At S480, the first electronic device 100a/second electronic device 100b provides at least one recommendation based on the competency score to improvise at least one skill in the competency profile. For example, in the first electronic device 100a/second electronic device 100b as illustrated in the FIG. 1, the competency profile manager 110a/110b can be configured to provide at least one recommendation based on the competency score to improvise at least one skill in the competency profile.

The various actions, acts, blocks, steps, or the like in the FIG. 4 may be performed in the order presented, in a different order or simultaneously. Further, in some embodiments, some of the actions, acts, blocks, steps, or the like may be omitted, added, modified, skipped, or the like without departing from the scope of the invention.

Figure 5:
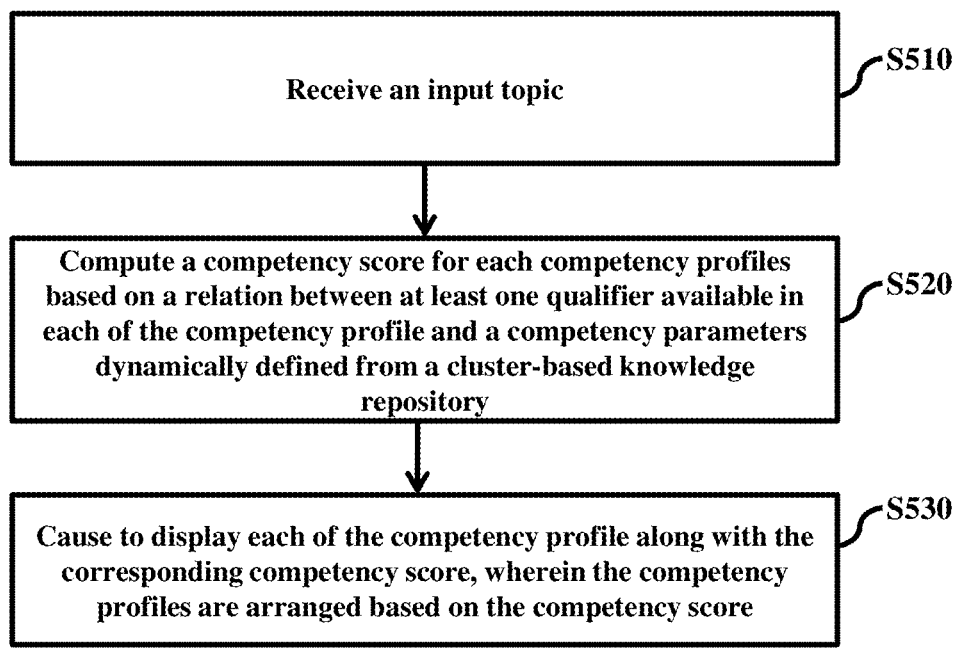
FIG. 5 is a flow chart illustrating a method for computing competency scores and displaying competency profiles along with the competency scores, according to an embodiment as disclosed herein.

FIG. 5 is a flow chart illustrating a method for computing competency scores and displaying competency profiles along with the competency scores, according to an embodiment as disclosed herein.

Referring to the FIG. 5, at S510, the first electronic device 100a/second electronic device 100b receives the input profile (competency profiles). For example, in the first electronic device 100a/second electronic device 100b as illustrated in the FIG. 1, the competency profile manager 110a/110b can be configured to receive the input profile.

At S520, the first electronic device 100a/second electronic device 100b computes the competency score for each competency profile based on the relation between at least one qualifier available in each of the competency profile and the competency parameters dynamically defined from the cluster-based knowledge repository 120a/120b. For example, in the first electronic device 100a/second electronic device 100b as illustrated in the FIG. 1, the competency profile manager 110a/110b can be configured to compute the competency score for each of the competency profile based on the relation between the at least one qualifier available in each of the competency profile and the competency parameters dynamically defined from the cluster-based knowledge repository 120a/120b.

At S530, the first electronic device 100a/second electronic device 100b causes to display each of the competency profile along with the corresponding competency score, where the competency profiles are arranged based on the competency score. For example, in the first electronic device 100a/second electronic device 100b as illustrated in the FIG. 1, the competency profile manager 110a/110b can be configured to cause to display each of the competency profiles along with the corresponding competency score, where the competency profiles are arranged based on the competency score.

The various actions, acts, blocks, steps, or the like in the FIG. 5 may be performed in the order presented, in a different order or simultaneously. Further, in some embodiments, some of the actions, acts, blocks, steps, or the like may be omitted, added, modified, skipped, or the like without departing from the scope of the invention.

Figure 6:
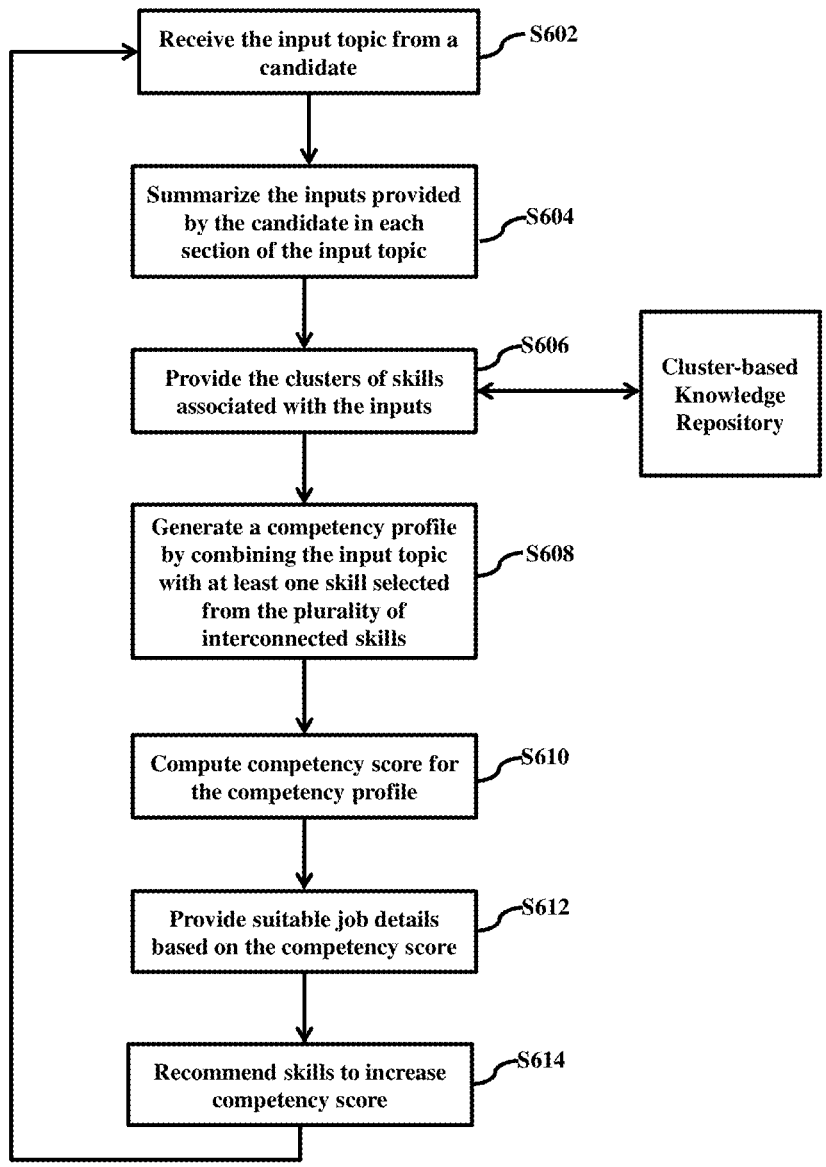
FIG. 6 is a flow diagram illustrating an example scenario in which a holistic competency profile is created, according to an embodiment as disclosed herein.

FIG. 6 is a flow diagram illustrating an example scenario in which the competency profile is created, according to an embodiment as disclosed herein.

Referring to the FIG. 6, at S602, the competency profile manager 110a/110b can be configured to receive the input topic (e.g., certified Java, PHP project in "C" company, etc.) from the candidate profile. At S604, the competency profile manager 110a/110b can be configured to summarize the inputs provided by the candidate in each section i.e., "certified Java" in one section and "PHP project in "C" company" in another section of the candidate profile. Further, the competency profile manager 110a/110b provides the clusters of interconnected skills including corresponding to the input topic.

The competency profile manager 110a/110b communicates with the cluster-based knowledge repository 120a/120b for providing the competency parameters corresponding to the input topic provided in each section of the candidate profile. Further, at S608, the competency profile manager 110a/110b generates the competency profile by combining the input topic with at least one skill selected from the plurality of interconnected skills. For e.g., the selected skills can include "PHP developer" and other interconnected skills of the "PHP developer".

Further, at S610, the competency profile manager 110a/110b computes the competency score for the candidate profile. Further, at S612, based on the competency score, the competency profile manager 110a/110b can provide suitable jobs/recommendation to the candidates. Further, at S614, the competency profile manager 110a/110b can be configured to provide recommendation(s) related to different skills in order to improvise the competency score (i.e., skills missing, trending skills (related to the input topic) which can lead to increase the probability of getting job opportunities, or the like).

Similar operations can be performed by the recruiter for creating the competency profile and for determining the competency profile of the candidates. The proposed methods and system can be used for creating the competency profile in any other technical domains. For e.g., doctors can create the competency profile, in field of education assessment, SNS application for recommending users based on skill mapping, etc.

Unlike the conventional systems and methods, the proposed method can be used to recommend/suggest profiles based on skill mapping. For e.g., consider a user-A using a SNS application and intent to create a profile with an input topic "working at semiconductor fabrication" for the SNS application. Then, according to the proposed method, a graphical element including at least one knowledge cluster corresponding to the input topic is displayed to the user-A while creating the profile. Thus, a competency profile of the user-A for the SNS application is generated based on the at least one knowledge cluster. The competency profile can include all the interconnected skills of the input topic "semiconductor fabrication", the interconnected skills such as, semiconductor chip design, digital/analog integrated circuit, etc. Further, due to the competency profile of the user-A, the proposed method can allow the SNS application to recommend the user-A with the profiles of other users (user-B, user-C, or the like) based on the competency profile mapping between the user-A and other users of the SNS application.

In another example, the SNS application can use the at least one knowledge cluster of the interconnected skills to determine the match among the skills of the users of the SNS application and recommend the users (i.e., similar to the people you might know) based on the skills.

Unlike the conventional systems and methods, where a filled competency map of a candidate aids in learning/finding jobs, the proposed method can be used to provide a raw skill diagram (cluster with dendograms) as an index for a particular domain. For e.g., if the candidate pursuing a course in "embedded language" and wants to learn about the next levels to be pursued in the embedded language, topic involved in each level, current requirement of the course in each level, etc., then the proposed method can provide one or more cluster with the dendograms connected to aid the user with the required information.

For e.g., consider a scenario in which a doctor resident of India looking for a job opportunity in Australia. The conventional method allows the doctor either to upload a doctor profile in the job searching engine of the Australia/India, or to directly share the doctor profile with consultants (of Australia/India). As known, a nomenclature (i.e., terminology/requirements) related to skills may vary depending on a geographical location. Hence, it is very difficult for both the doctor, and the consultants to match with the skill provided by the doctor and skills required by the available jobs. Unlike the conventional methods and systems, the proposed method can be used to provide a relevant match between the competency profiles based on analyzing different nomenclature(s) presented in the each of the competency profiles.

Unlike the conventional methods and systems, the proposed methods allows competency based skill enhancement education programme—for example National Skill Development etc., entry level, formative stage, and summation.

Figure 7A:
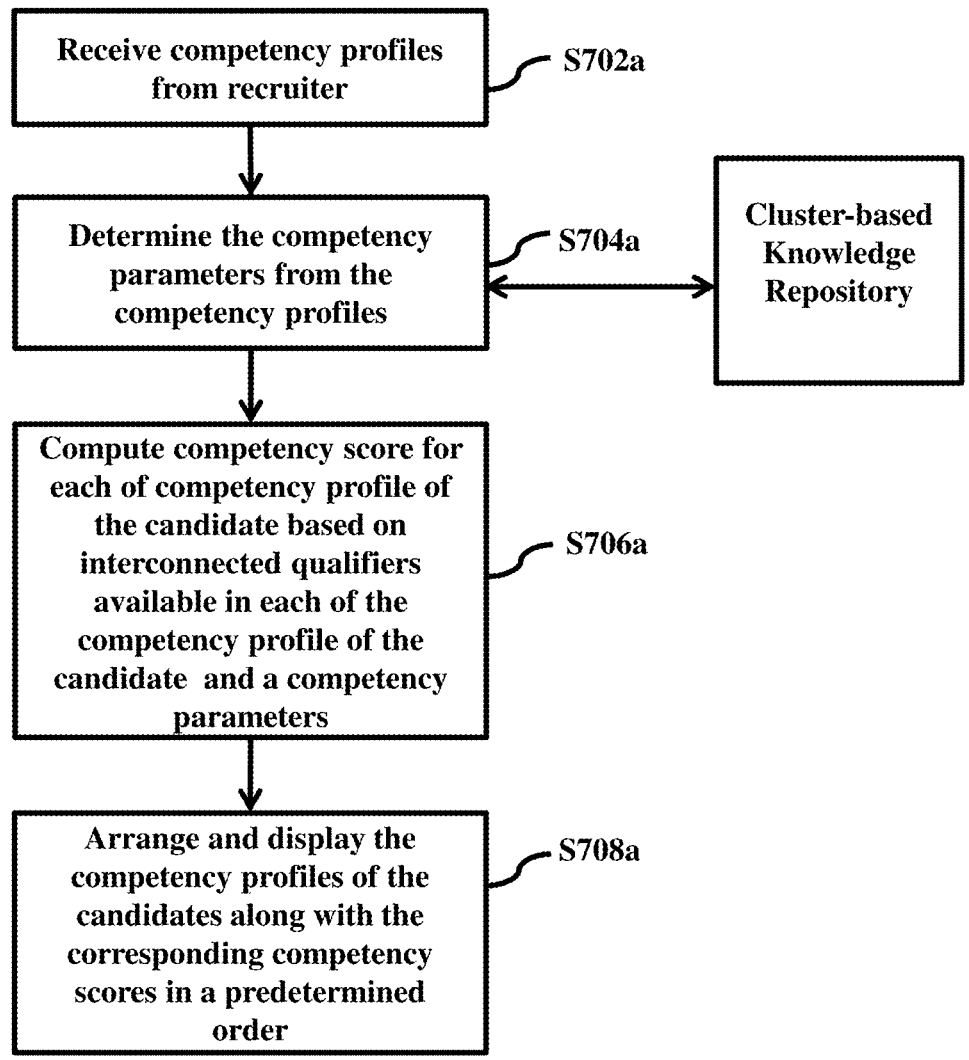
FIG. 7A is a flow diagram illustrating an example scenario in which a recruiter sorts competency profile based on the competency scores, according to an embodiment as disclosed herein.

FIG. 7A is a flow diagram illustrating an example scenario in which the recruiter sorts the competency profile, according to an embodiment as disclosed herein.

Referring to the FIG. 7A, at S702a, the competency profile manager 110a/110b receives the competency profiles from the recruiter (HR, manager, etc.). Further, at S704a, the competency profile manager 110a/110b determines the competency parameters from the competency profiles. The competency profile manager 110a/110b communicates with the competency parameters inventory 121a/121b in order to determine the competency parameters corresponding to the competency profiles.

Further, at S706a, the competency profile manager 110a/110b computes competency score for each of competency profile received from the recruiter based on interconnected qualifiers available in each of the competency profile of the candidate and the competency parameters within the competency profile of the candidate. Furthermore, at S708a, the competency profile manager 110a/110b arranges and displays each competency profile from the recruiter along with the corresponding competency scores in a predetermined order.

Figure 7B:
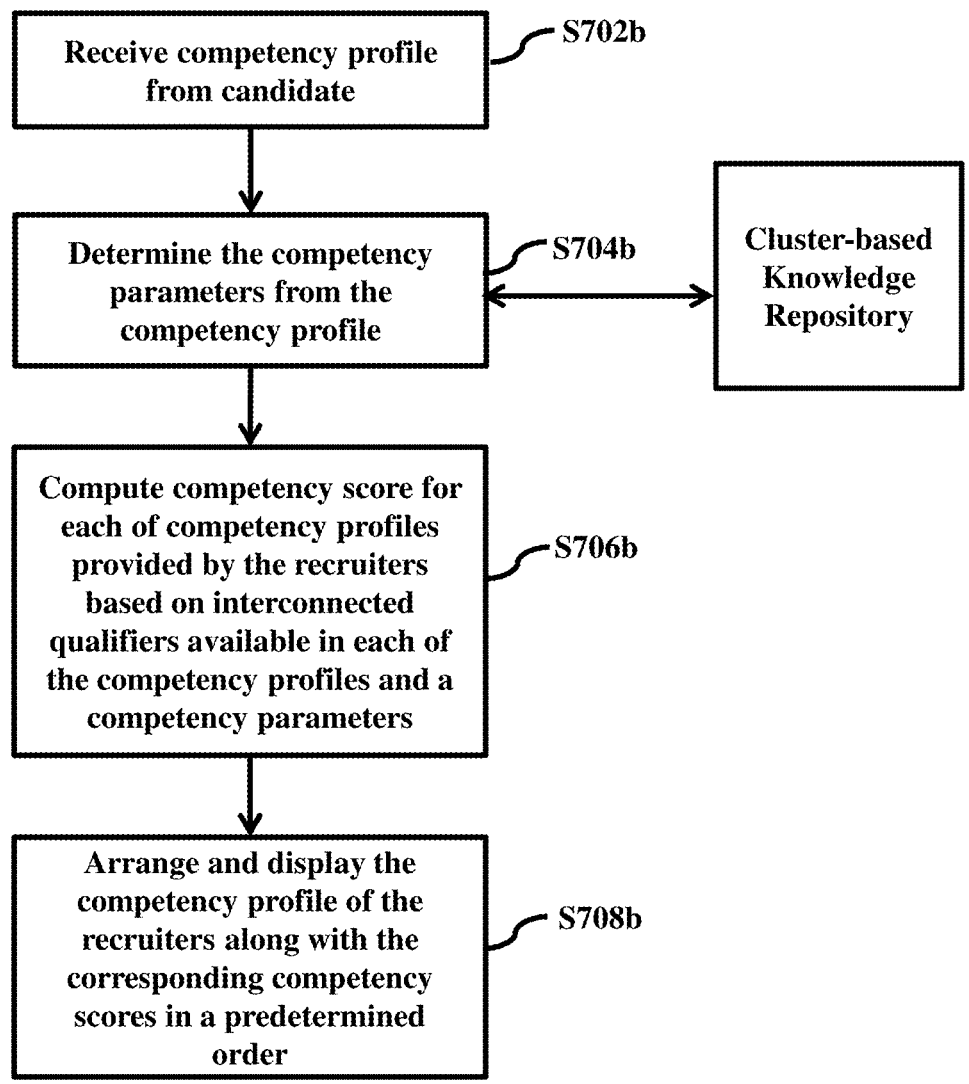
FIG. 7B is a flow diagram illustrating an example scenario in which a candidate sorts competency profiles based on the competency scores, according to an embodiment as disclosed herein.

FIG. 7B is a flow diagram illustrating an example scenario in which the candidate sorts the competency profiles, according to an embodiment as disclosed herein.

Referring to the FIG. 7B, at S702b, the competency profile manager 110a/110b receives the competency profile from the candidate. Further, at S704b, the competency profile manager 110a/110b determines the competency parameters from the competency profile. The competency profile manager 110a/110b communicates with the competency parameters Inventory 121a/121b in order to determine the competency parameters.

Further, at S706b, the competency profile manager 110a/110b computes the competency score for each of the competency profile provided by the recruiter based on interconnected qualifiers available in each of the competency profile and the competency parameters of the competency profile. Furthermore, at S708b, the competency profile manager 110a/110b arranges and displays the competency profiles provided by the recruiter, to the candidate, along with the corresponding competency scores in a predetermined order (e.g., chronological).

Figure 8A:
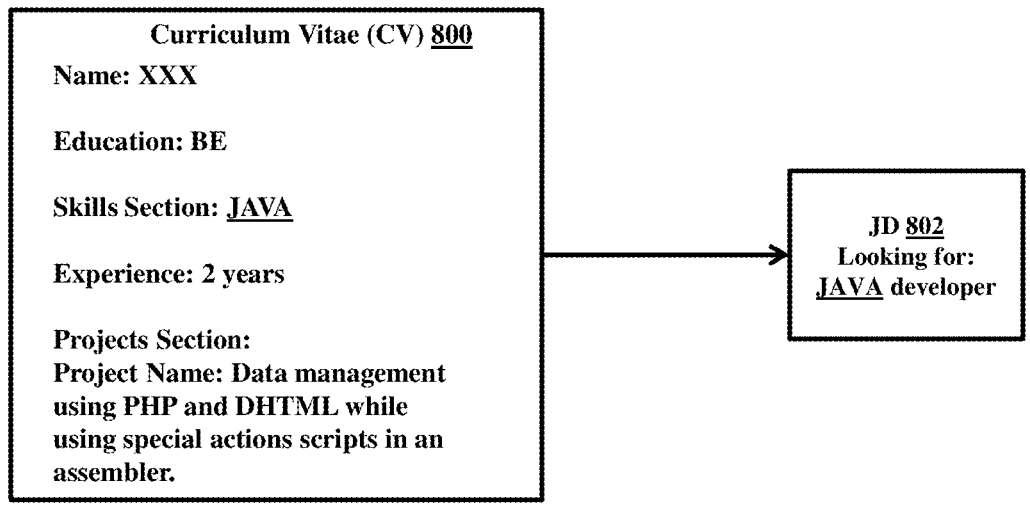
FIG. 8A illustrates a conventional mechanism in which a relevant Job Description (JD) for a Curriculum Vitae (CV) profile is selected and displayed.

FIG. 8A illustrates a conventional mechanism in which a relevant JD 802 for a CV profile 800 is selected and displayed. Consider a scenario in which a candidate is looking for a job, the candidate can either upload a candidate profile to a job search engine directly or can provide the candidate profile to consultant, and/or HR. Generally, as the HR and/or consultant are non-technical users and manages candidate profile (i.e., CV, resumes and JDs) from various sources associated with various technical domains. So, the HR and/or consultant either does not have a deep understanding of such technical domains or have a little or almost no understanding of such technical domains. Moreover, technical domains are generally interrelated and provides a plethora of technical information that requires an efficient analysis and deep learning requirements.

So, in the conventional mechanism, the HR, consultants, and the job search engines are solely dependent on the information provided in the CVs and JDs received from the various sources associated with the various technical domains. Hence, if the various sources associated with the various technical domains fails to provide any related skills, then the HR, consultants, the job search engines also fails to provide the results (details of relevant job availability) pertaining to the candidate profile.

Further, it is very difficult (or, cumbersome, time consuming) for the HR, consultants to manually explore the interconnected skills from the various technical domains.

Referring to the FIG. 8A, consider a scenario in which a candidate may provide an input profile i.e., the CV profile 800 of the candidate to the one or more job search engines (job source systems, job portals, or the like) in order to search for the relevant JD. The CV profile 800 includes different sections such as Name, Education, Skills, Experience, Project, etc. The CV profile 800 may include "JAVA" in the skill section of the CV profile 800.

The job searching engines can include a plurality of JDs. In general, each of the JD may include details of the skills, experience level in the skills, salary details, etc., required for the available job position. As a job search engine is dependent on the information presented in the CV profile 800, the job search engine determines and provides a JD 802 relevant for the CV 800. The required skills "JAVA" provided in the JD 802 matches the "JAVA" provided within the skill section of the CV 800.

The other relevant JDs which may be relevant to the candidate cannot be fetched/provided to the candidates. Thus, the job searching engine, HR, consultant fails to provide result which includes all related interconnected skills corresponding to the input topic in each section of the CV 800.

Figure 8B:
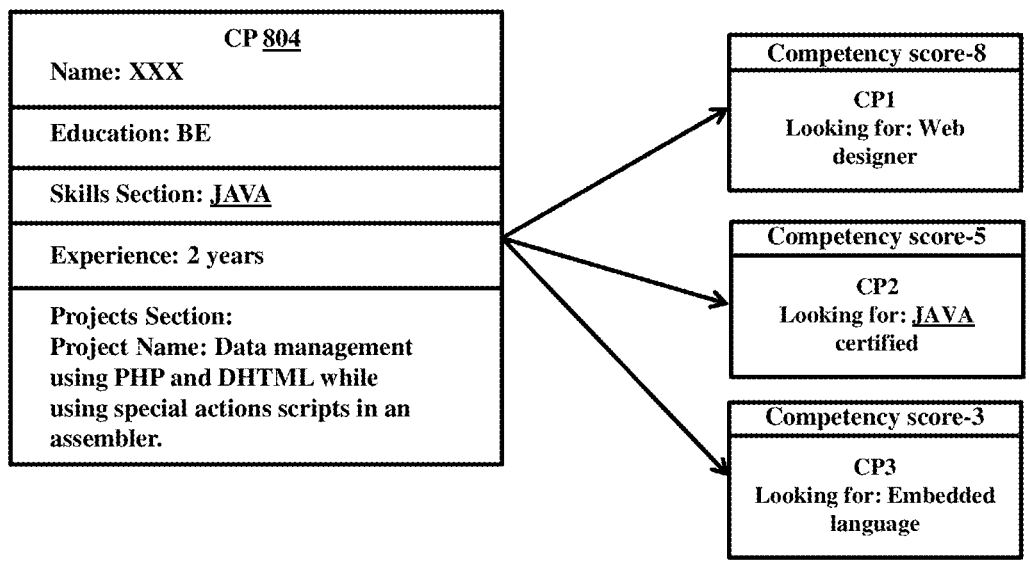
FIG. 8B illustrates a mechanism in which a relevant competency profile is selected and displayed, according to an embodiment as disclosed herein.

FIG. 8B, illustrates a mechanism in which a relevant competency profile 804 based in the input topic provided by the candidate is selected and displayed, according to an embodiment as disclosed herein.

Unlike the conventional systems and methods, the proposed method can generate a holistic competency profile based on the input topic provided by the candidate.

For e.g., unlike the conventional methods and systems (as disclosed in the FIG. 8A), the proposed competency manager 110a/110b can be configured to determine the competency parameters associated with each of the input topic provided by the candidate and generates a competency profile 804 for the candidate. According to the proposed system 100, based on the input topic i.e., "JAVA" in the skill section" a graphical element including at least one knowledge cluster (cluster-1, cluster-2 and cluster-3) of interconnected skills corresponding to the input topic is automatically determined. Thus, by virtue of the competency profile 800, the job search engines can provide other relevant competency profiles (CP1, CP2, and CP3).

The other relevant CP1, CP2, CP3 are provided to the candidate based on an input topic (i.e., "JAVA") provided i.e., CP1 including "web developer" is provided to the candidate, CP2 including "Java certified" is provided to the candidate and CP3 including the "Embedded language" is provided to the candidate. As the job search engine utilizes the proposed method to intelligently identify that the candidate with skills "Web developer" is well versed with skill "DHTML" mentioned in the project section of the competency profile. The CP3 including the skill "Embedded language" is provided to the user.

Thus, the other relevant CP1, and CP3 can include the interconnected skill "web developer" and "Embedded language" although not provided in the skill section, or any of the other section within the CP 804.

Unlike to conventional systems and methods, the at least one knowledge cluster of interconnected skills is dynamically changed based on the change in the input profile/input topic provided.

Unlike to conventional systems and methods, the relevant CP1, CP2 and CP3 are displayed and arranged based on the competency score assigned. For e.g., the competency score assigned to CP1 including "Web developer" is given higher competency score than the CP3 including "embedded programmer".

Figure 9A:
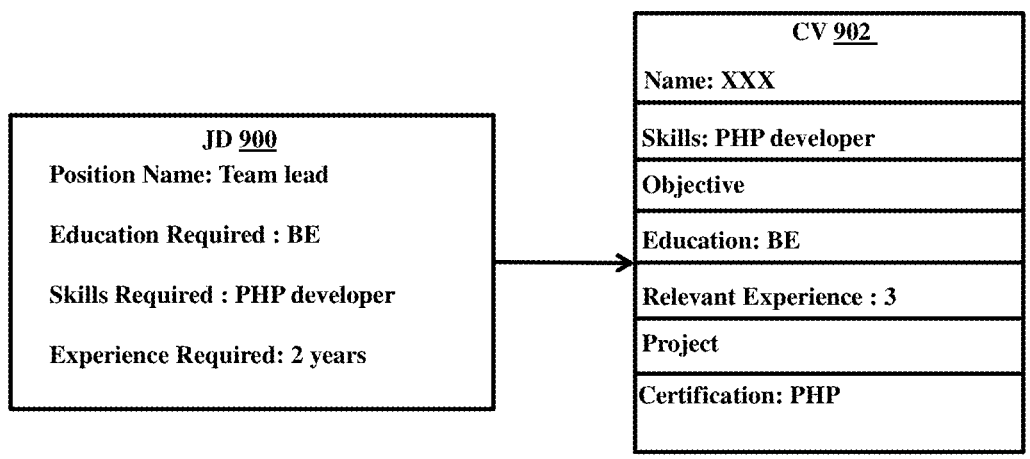
FIG. 9A illustrates a conventional mechanism in which a relevant CV profile for a JD is selected and displayed.

FIG. 9A illustrates a conventional mechanism in which a relevant CV profile(s) 902 for a JD 900 is selected and displayed.

Consider a scenario in which a recruiter is looking for a candidates, the recruiter can either upload the JD 900 to a job search engine directly or can provide the candidate profile to consultant, and/or HR. Generally, as the HR and/or consultant are non-technical users and manages the JD 900 from various sources associated with various technical domains. So, the HR and/or consultant either does not have a deep understanding of such technical domains or have a little or almost no understanding of such technical domains. Moreover, technical domains are generally interrelated and provides a plethora of technical information that requires an efficient analysis and deep learning requirements.

So, in the conventional mechanism, the HR, consultants, and the job search engines are solely dependent on the information provided in the JD 900 received from the various sources associated with the various technical domains. Hence, if the various sources associated with the various technical domains fails to provide any related skills, then the HR, consultants, the job search engines also fails to provide the results (details of relevant candidate profile) pertaining to the JD 900.

Further, it is very difficult (or, cumbersome, time consuming) for the HR, consultants to manually explore the interconnected skills from the various technical domains.

Referring to the FIG. 9A, consider a scenario in which a recruiter may provide an input profile i.e., the JD 900 to the one or more job search engines (job source systems, job portals, or the like) to get the CV profile. The JD may include "skills required: PHP developer".

The job searching engines can include a plurality of CVs. In general each of the CV may include details of the candidate, details such as experience, work history, salary details, projects completed, certification, etc. As a job search engine is dependent on the information presented in the CV profile 800 the job search engine determines and provides a CV profile 902 relevant for the JD 900. The required skills "PHP developer" provided in the JD 802 matches the "PHP developer" provided in the JD 900.

The other relevant CVs which may be relevant for the job opening cannot be fetched/provided to the HR, consultant. Thus, the job searching engine, HR, consultant fails to provide result which includes all related interconnected skills corresponding to the input topic in the JD 900.

Figure 9B:
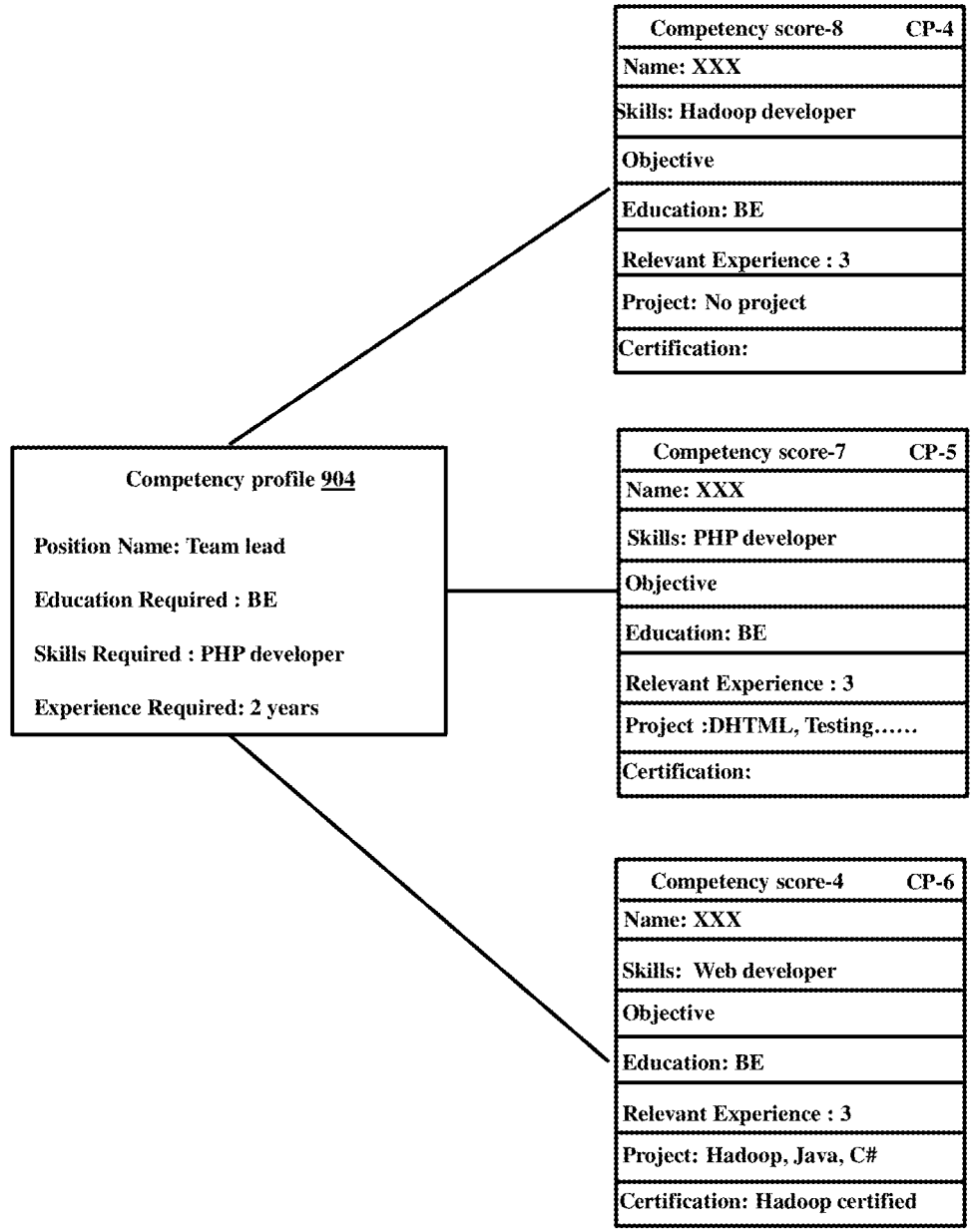
FIG. 9B illustrates a mechanism in which a relevant competency profile is selected and displayed, according to an embodiment as disclosed herein.

FIG. 9B, illustrates a mechanism in which the relevant CV profile(s) 902 for the JD 900 is selected and displayed, according to an embodiment as disclosed herein.

Unlike the conventional systems and methods, the proposed method can generate competency profile 904 based on the input topic.

For e.g., unlike the conventional methods and systems (as disclosed in the FIG. 9A), the proposed competency manager 110a/110b can be configured to generate the competency profile 900. According to the proposed system 100, based on the input i.e., "require PHP developer" in the competency profile 904, the graphical element including at least one knowledge cluster (cluster-1, cluster-2 and cluster-3) of interconnected skills corresponding to the input topic is automatically determined. Thus, by virtue of the competency profile 904, the job search engines can provide other relevant competency profiles (CP4, CV5, and CV6) are determined.

The other relevant CP4, CP5, CP6 to the recruiter based on an input topic (i.e., "PHP developer") provided i.e., CP4 including skills "Hadoop programmer" is provided to the recruiter, CP5 including skills "PHP developer" is provided to the recruiter and CP6 including the "web developer" is provided to the recruiter. As the job search engine utilizes the proposed method to intelligently identify that the candidate with skills "Hadoop" is well versed with skill "PHP" and the CP3 including the skill "web developer" is well versed with "PHP" is provided to the recruiter.

Thus, the other relevant CP4, and CP6 can include the interconnected skill "Hadoop" and "web developer" although not provided in the skill section, or any of the other section within the CP 904.

Unlike to conventional systems and methods, the relevant CP4, CP5, and CP6 are displayed and arranged based on the competency score. For e.g., the competency score assigned to CP4 including "Hadoop developer" is given higher competency score than the CP6 including "Web developer". The fact that "Hadoop" incorporates the probability of having the knowledge in "PHP programming", and "Web developer" in contrast, vice versa may not be possible.

FIGS. 10A-10D illustrates a scenario in which the competency profile manager 110/110b generates and fetches the competency profile, according to an embodiment as disclosed herein.

Figure 10A:
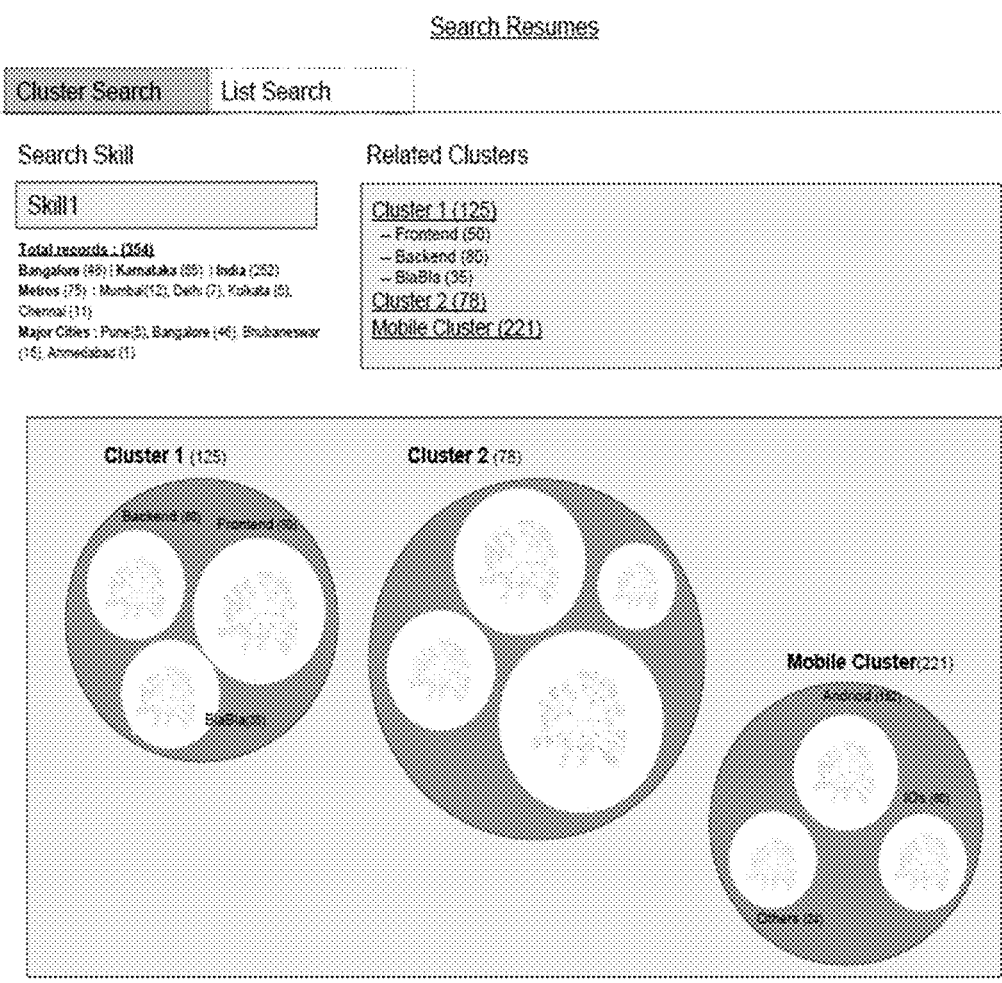
FIGS. 10A-10D illustrates a scenario in which a recruiter creates a holistic competency profile and fetches a holistic candidate profiles, according to an embodiment as disclosed herein.

Referring to the FIG. 10A, a User Interface (UI) of the first electronic device 100a/second electronic device 100b is shown in which the recruiter performs a search for the relevant competency profile of the candidate.

Initially, the recruiter provides an input topic i.e., "Skill 1", based on the input provided the graphical element including cluster 1, cluster 2, and mobile cluster is displayed to the recruiter. Each of the cluster 1, cluster 2 and the mobile cluster includes one or more interconnected skills corresponding to the input topic "Skill 1".

Unlike the conventional methods and systems, the proposed method and system dynamically provides the knowledge cluster of interconnected skills aiding the recruiter to create the competency profile.

Figure 10B:
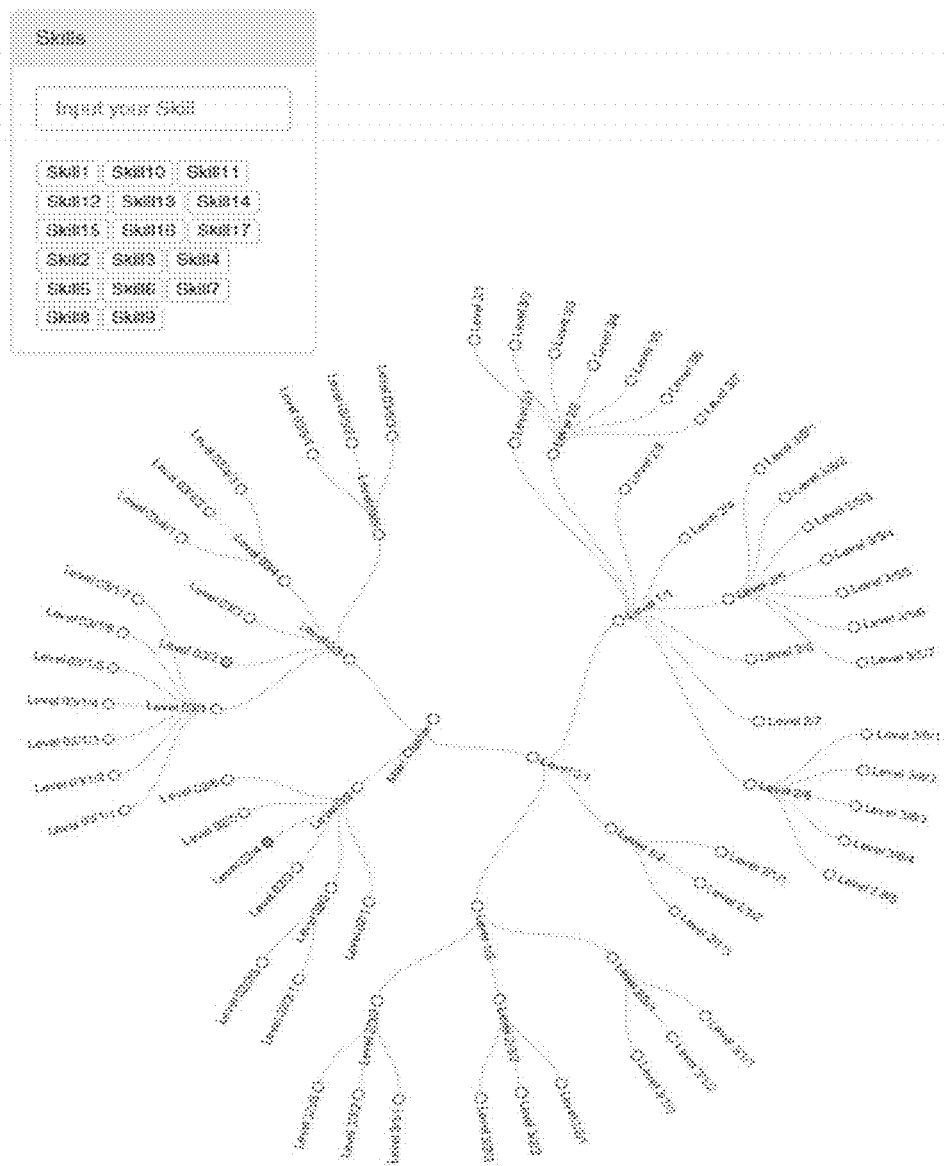

Referring to the FIG. 10B, a UI representing the knowledge cluster of interconnected skills in which the plurality of skills are recommended to the recruiter/candidate corresponding to the input topic.

Figure 10C:

FIG. 10C illustrates a UI in which the resume associated with each competency profile is arranged based on the experience and availability.

Figure 10D:
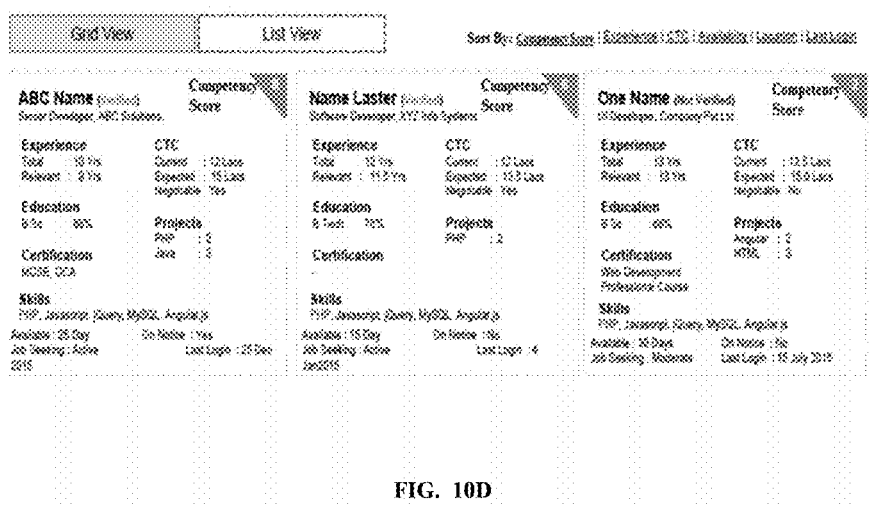

FIG. 10D illustrates a UI in which competency profile are arranged according to the competency score.

For e.g., a recruiter may create the competency profile for one of the available position in a company and may provide an input topic i.e., (e.g., candidate experience in "windows server active directory configuration"). Similarly, a job seeker can create a competency profile which includes an input topic "Microsoft® certified technology specialists" and may not have included the "windows server active directory configuration" in the resume.

Unlike the conventional methods and systems, the proposed method can automatically include a skill "windows server active directory configuration corresponding to the input topic i.e., "Microsoft® technology specialists". Thereby, providing a match between the recruiter and the candidate.

Figure 11A:
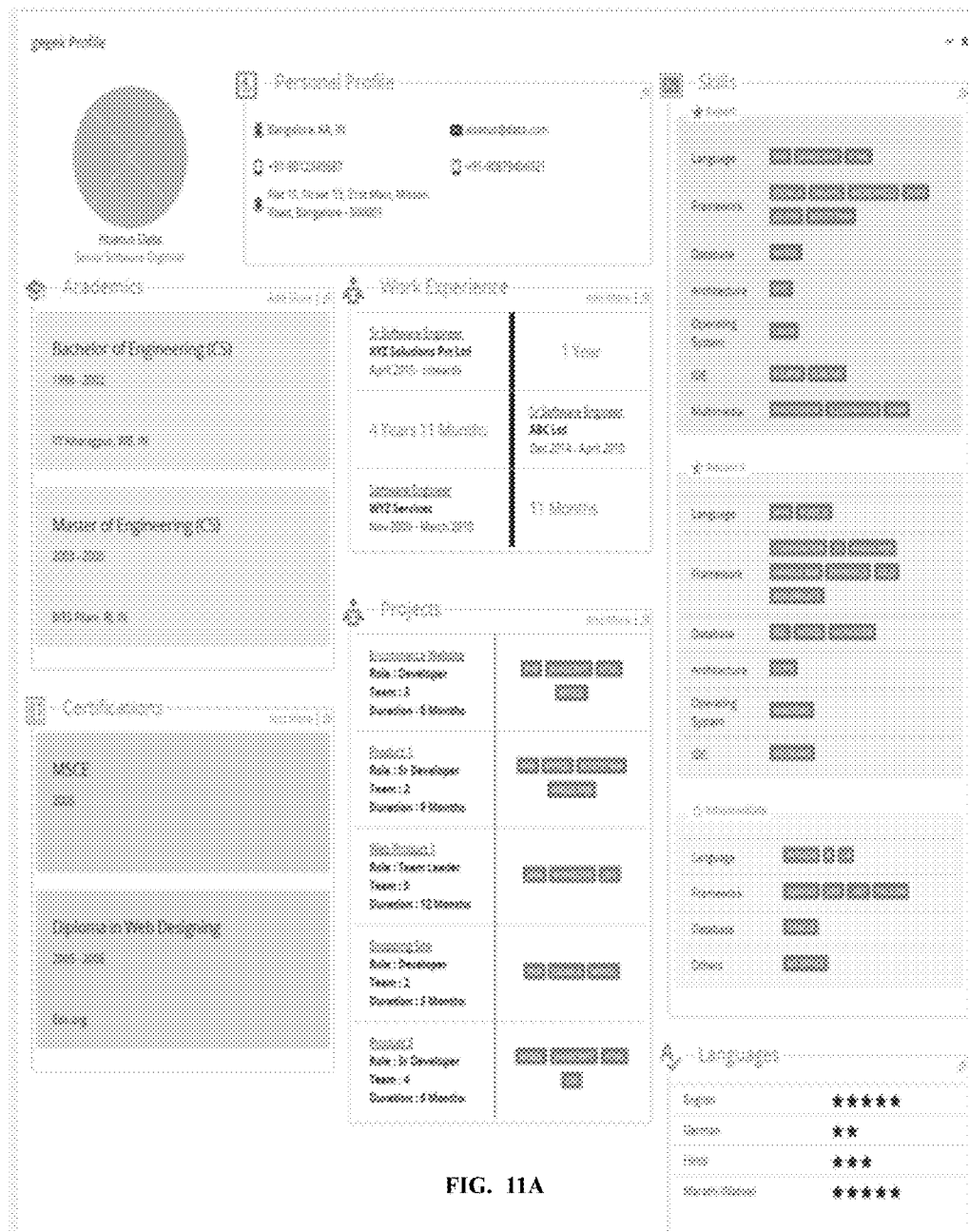
FIG. 11A illustrates a competency profile of a candidate, according to an embodiment as disclosed herein.

FIG. 11A illustrates the competency profile of the candidate, according to an embodiment as disclosed herein.

Figure 11B:
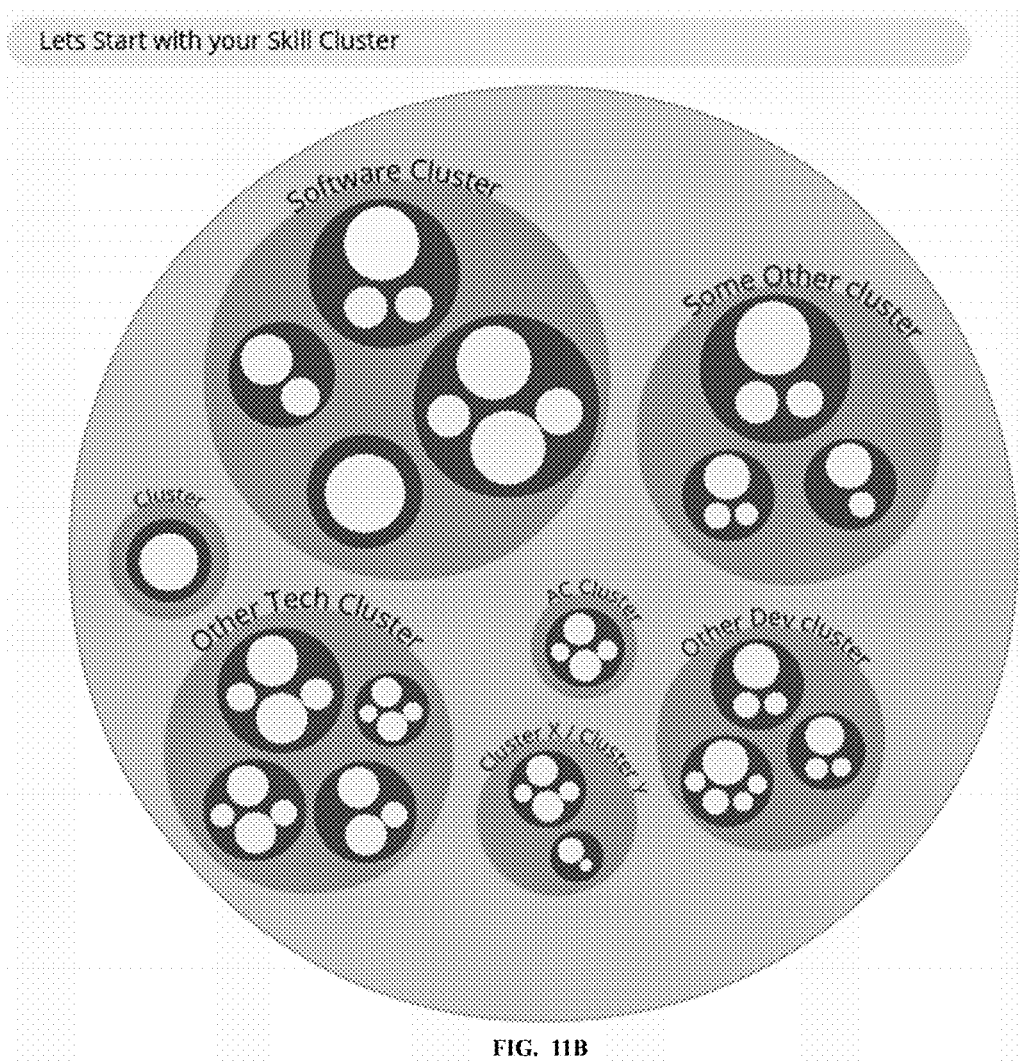
FIG. 11B illustrates a graphical element including at least one knowledge cluster of interconnected skills required for creating the competency profile of a candidate, according to an embodiment as disclosed herein.

In an embodiment, the first electronic device 100a/second electronic device 100b can create the competency profile by selecting the related clusters from the graphical element. The user of the first electronic device 100a/second electronic device 100b can further explore various clusters associated with the other technologies from the graphical element as shown in FIG. 11B.

The embodiments disclosed herein can be implemented through at least one software program running on at least one hardware device and performing network management functions to control the elements. The elements shown in the FIGS. 1 through 11 include blocks which can be at least one of a hardware device, or a combination of hardware device and software units.

The foregoing description of the specific embodiments will so fully reveal the general nature of the embodiments herein that others can, by applying current knowledge, readily modify or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

What is claimed is:

1. A computer-implement method for competency information management, comprising:

creating a cluster-based knowledge repository, wherein the cluster-based knowledge repository comprises a plurality of the knowledge clusters each comprising a set of skills interconnected among each other, wherein at least one cluster from the plurality of knowledge clusters are associated with at least one technology domain;

receiving by a competency profile manager an input topic provided in at least one section of a plurality of sections of a candidate profile;

determining by the competency profile manager a plurality of competency parameters corresponding to the input topic from the cluster-based knowledge repository;

dynamically determining by the competency profile manager at least one knowledge cluster of interconnected skills from the plurality of the knowledge clusters knowledge repository based on the plurality of competency parameters;

displaying by the competency profile manager a graphical element comprising the at least one knowledge cluster of interconnected skills corresponding to the input topic;

detecting by the competency profile manager at least one skill selected the plurality of interconnected skills;

generating by the competency profile manager a competency profile by combining the input topic with the at least one skill selected from the plurality of interconnected skills;

storing by the competency profile manager the competency profile;

determining by the competency profile manager a plurality of qualifiers available in the competency profile, validating by the competency profile manager whether skills corresponding to each of the qualifier is available in the competency profile, wherein the skills are dynamically defined based on the plurality of competency parameters;

determining by the competency profile manager a competency score based on the validation; and providing by the competency profile manager at least one recommendation based on the competency score to improvise at least one skill in the competency profile.

2. The method of claim 1, wherein the qualifiers comprises at least one of an education level available in the competency profile, a certification level available in the competency profile, an experience level in a particular technical domain available in the competency profile, availability of complete skill sets for each technical domain in the competency profile, and an experience level in each of the available skills in the competency profile.

3. The method of claim 1, wherein each of the competency parameter is dynamically determined from each of the knowledge clusters of interconnected skills from the cluster-based knowledge repository based on at least one of a relation among clusters, a relation among skills available in a cluster, and a relation between a skill in one cluster with a skill in another cluster.

4. The method of claim 1, wherein the competency parameter comprises at least one of an education level, a certification level, an experience level in a particular technical domain, a relationship between one skill to another skill, a relationship between the input topic with at least one skill, and a level of experience in the at least one skill.

5. The method of claim 1, wherein the input topic comprises an input provided by a user and an input from each section of the candidate profile, a relation between each section of the candidate profile, a context in which each section of the candidate profile is described.

6. A computer-implement method for competency information management, comprising:

creating a cluster-based knowledge repository, wherein the cluster-based knowledge repository comprises a plurality of the knowledge clusters each comprising a set of skills interconnected among each other, wherein at least one cluster from the plurality of knowledge clusters are associated with at least one technology domain;

receiving by a competency profile manager an input profile, wherein the input profile is one of a candidate profile and a job description of a recruiter;

dynamically defining by the competency profile manager a plurality of competency parameters corresponding to the input profile from each of the knowledge clusters of interconnected skills from the cluster-based knowledge repository based on at least one of a relation among clusters, a relation among skills available in a cluster, and a relation between a skill in one cluster with a skill in another cluster;

determining by the competency profile manager at least one qualifier available in each competency profile of a plurality of competency profiles;

computing by the competency profile manager a competency score for each competency profile from the plurality of competency profiles based on a relation between the at least one qualifier available in each of the competency profile and the plurality of competency parameters dynamically defined from the cluster-based knowledge repository;

arranging by the competency profile manager the plurality of competency profiles based on the competency score of each competency profile; and displaying by the competency profile manager the plurality of arranged competency profiles along with the corresponding competency score.

7. The method of claim 6, wherein the competency parameters comprises at least one of an education level, a certification level, an experience level in a particular technical domain, a relationship between one skill to another skill, a relationship between the input topic with at least one skill, and a level of experience in the at least one skill.

8. The method of claim 6, wherein the qualifiers comprises at least one of an education level available in the competency profile, a certification level available in the competency profile, an experience level in a particular technical domain available in the competency profile, availability of complete skill sets for each technical domain in the competency profile, and an experience level in each of the available skills in the competency profile.

9. An electronic device for competency information management comprising:

a cluster-based knowledge repository;
a processor; and
a competency profile manager, coupled to the processor and the cluster-based knowledge repository, configured to:

create a cluster-based knowledge repository, wherein the cluster-based knowledge repository comprises a plurality of the knowledge clusters each comprising a set of skills interconnected among each other, wherein at least one cluster from the plurality of knowledge clusters are associated with at least one technology domain;

receive an input topic provided in at least one section of a plurality of sections of a candidate profile;

determine a plurality of competency parameters corresponding to the input topic from the cluster-based knowledge repository;

dynamically determine least one knowledge cluster of interconnected skills from the plurality of the knowledge clusters knowledge repository based on the plurality of competency parameters;

display a graphical element comprising the at least one knowledge cluster of interconnected skills corresponding to the input topic, detect at least one skill selected the plurality of interconnected skills;

generate a competency profile by combining the input topic with the at least one skill selected from the plurality of interconnected skills, store the competency profile;

determine a plurality of qualifiers available in the competency profile, validate whether skills corresponding to each of the qualifier is available in the competency profile, wherein the skills are dynamically defined based on the plurality of competency parameters;

determine a competency score based on the validation; and provide at least one recommendation based on the competency score to improvise at least one skill in the competency profile.

10. The electronic device of claim 9, wherein the qualifiers comprises at least one of an education level available in the competency profile, a certification level available in the competency profile, an experience level in a particular technical domain available in the competency profile, availability of complete skill sets for each technical domain in the competency profile, and an experience level in each of the available skills in the competency profile.

11. The electronic device of claim 9, wherein each of the competency parameter is dynamically determined from each of the knowledge clusters of interconnected skills from the cluster-based knowledge repository based on at least one of a relation among clusters, a relation among skills available in a cluster, and a relation between a skill in one cluster with a skill in another cluster.

12. The electronic device of claim 9, wherein the competency parameters comprise at least one of an education level, a certification level, an experience level in a particular technical domain, a relationship between one skill to another skill, a relationship between the input topic with at least one skill, and a level of experience in the at least one skill.

13. The electronic device of claim 9, wherein the input topic comprises an input provided by a user and an input from each section of the candidate profile, a relation between each section of the candidate profile, a context in which each section of the candidate profile is described.

14. An electronic device for competency information management comprising:
   a cluster-based knowledge repository;
   a processor; and
   a competency profile manager, coupled to the processor and the cluster-based knowledge repository, configured to:
   create a cluster-based knowledge repository, wherein the cluster-based knowledge repository comprises a plurality of the knowledge clusters each comprising a set of skills interconnected among each other, wherein at least one cluster from the plurality of knowledge clusters are associated with at least one technology domain;
   receive an input profile, wherein the input profile is one of a candidate profile and a job description of a recruiter;
   dynamically define a plurality of competency parameters corresponding to the input profile from each of the knowledge clusters of interconnected skills from the cluster-based knowledge repository based on at least one of a relation among clusters, a relation among skills available in a cluster, and a relation between a skill in one cluster with a skill in another cluster;
   determine at least one qualifier available in each competency profile of a plurality of competency profiles;
   compute a competency score for each competency profile the plurality of competency profiles based on a relation between the at least one qualifier available in each of the competency profile and the plurality of competency parameters dynamically defined from the cluster-based knowledge repository;
   arrange the plurality of competency profiles based on the competency score of each competency profile; and
   display the plurality of arranged competency profile along with the corresponding competency score.

15. The electronic device of claim 14, wherein the competency parameters comprises at least one of an education level, a certification level, an experience level in a particular technical domain, a relationship between one skill to another skill, a relationship between the input topic with at least one skill, and a level of experience in the at least one skill.

16. The electronic device of claim 14, wherein the qualifiers comprises at least one of an education level available in the competency profile, a certification level available in the competency profile, an experience level in a particular technical domain available in the competency profile, availability of complete skill sets for each technical domain in the competency profile, and an experience level in each of the available skills in the competency profile.

17. A competency information management system comprising:
   a first electronic device configured to include a cluster-based knowledge repository coupled to a competency profile manager, wherein the competency profile manager is configured to:
   create a cluster-based knowledge repository, wherein the cluster-based knowledge repository comprises a plurality of the knowledge clusters each comprising a set of skills interconnected among each other, wherein at least one cluster from the plurality of knowledge clusters are associated with at least one technology domain;
   receive an input topic provided in at least one section of a plurality of sections of a candidate profile,
   determine a plurality of competency parameters corresponding to the input topic from the cluster-based knowledge repository;
   dynamically determine at least one knowledge cluster of interconnected skills from the plurality of the knowledge cluster-based knowledge repository based on the plurality of competency parameters, and
   send the at least one knowledge cluster of interconnected skills corresponding to the input topic; and
   a second electronic device configured to include a competency profile manager, wherein competency profile manager configured to:
   receive the at least one knowledge cluster of interconnected skills corresponding to the input topic from the first electronic device;
   display a graphical element comprising the at least one knowledge cluster of interconnected skills corresponding to the input topic,
   receive at least one skill selected from the plurality of interconnected skills,
   generate a competency profile by combining the input topic with the at least one skill, and
   store the competency profile.

18. The system of claim 17, wherein one of the competency manager at the first electronic device and the competency manager at the second electronic device is configured to:
   receive an input profile, wherein the input profile is one of a candidate profile and a job description of a recruiter;
   dynamically define a plurality of competency parameters corresponding to the input profile from each of the knowledge clusters of interconnected skills from the cluster-based knowledge repository based on at least one of a relation among clusters, a relation among skills available in a cluster, and a relation between a skill in one cluster with a skill in another cluster;
   determine at least one qualifier available in each competency profile of a plurality of competency profiles;
   compute a competency score for each competency profile of the plurality of competency profiles based on the plurality of qualifiers dynamically defined from the cluster-based knowledge repository; and
   arrange the plurality of competency profiles based on the competency score of each competency profile; and
   display each of the plurality of arranged competency profiles along with the corresponding competency score.

19. The system of claim 17, wherein one of the competency manager at the first electronic is configured to:

determine a plurality of interconnected qualifiers available in the competency profile, validate whether skills corresponding to each of the qualifier are available in the competency profile, wherein the skills are dynamically defined based on the plurality of competency parameters;

determine a competency score based on the validation; and provide at least one recommendation based on the competency score to improvise at least one skill in the competency profile.

20. The system of claim 18, wherein the qualifiers comprises at least one of an education level available in the competency profile, a certification level available in the competency profile, an experience level in a particular technical domain available in the competency profile, availability of complete skill sets for each technical domain in the competency profile, and an experience level in each of the available skills in the competency profile.

21. The system of claim 17, wherein each of the competency parameter is dynamically determined from each of the knowledge clusters of interconnected skills from the cluster-based knowledge repository based on at least one of a relation among clusters, a relation among skills available in a cluster, and a relation between a skill in one cluster with a skill in another cluster.

22. The system of claim 17, wherein the competency parameters comprise at least one of an education level, a certification level, an experience level in a particular technical domain, a relationship between one skill to another skill, a relationship between the input topic with at least one skill, and a level of experience in the at least one skill.

23. The system of claim 17, wherein the input topic comprises an input provided by a user and an input each section of the candidate profile.

* * * * *